United States Patent [19]

Horiguchi et al.

[11] Patent Number: 4,847,221

[45] Date of Patent: Jul. 11, 1989

[54] AlN SINTERED BODY HAVING HIGH THERMAL CONDUCTIVITY AND A METHOD OF FABRICATING THE SAME

[75] Inventors: Akihiro Horiguchi, Yokohama; Fumio Ueno; Mitsuo Kasori, both of Kawasaki; Yoshiko Sato, Tokyo; Masaru Hayashi; Hiroshi Endo, both of Yokohama; Kazuo Shinozaki, Tokyo; Akihiko Tsuge, Yokohama, all of Japan

[73] Assignee: Kabushiki Kaisha Toshiba, Kawasaki, Japan

[21] Appl. No.: 142,818

[22] Filed: Jan. 11, 1988

[30] Foreign Application Priority Data

Jan. 13, 1987 [JP] Japan .................................. 62-3954
Jan. 20, 1987 [JP] Japan .................................. 62-9034
Apr. 28, 1987 [JP] Japan .............................. 62-103059
May 8, 1987 [JP] Japan .............................. 62-110807
May 8, 1987 [JP] Japan .............................. 62-110813

[51] Int. Cl.$^4$ ............................................. C04B 35/58
[52] U.S. Cl. ........................................ 501/98; 501/96; 501/153
[58] Field of Search ................ 501/96, 98, 152, 153

[56] References Cited

U.S. PATENT DOCUMENTS

| | | | |
|---|---|---|---|
| 4,547,471 | 10/1985 | Huseby et al. | 501/98 OR |
| 4,578,364 | 3/1986 | Huseby et al. | 501/98 OR |
| 4,578,365 | 3/1986 | Huseby et al. | 501/98 OR |
| 4,591,537 | 5/1986 | Aldinger et al. | 501/98 X |
| 4,618,592 | 10/1986 | Kuramoto et al. | 501/96 OR |
| 4,627,815 | 12/1986 | Aldinger et al. | 501/98 X |
| 4,698,320 | 10/1987 | Kasori et al. | 501/98 X |

FOREIGN PATENT DOCUMENTS

| | | | |
|---|---|---|---|
| 0147101 | 7/1985 | European Pat. Off. | 501/98 |
| 0071575 | 4/1985 | Japan | 501/98 |
| 0171270 | 9/1985 | Japan | 501/98 |
| 1021978 | 1/1986 | Japan | 501/98 |

OTHER PUBLICATIONS

Iwase et al, "Developement of High Thermal Conductive AlN Ceramic Substrate Terminology", IMC Procedings, Tokyo, May 21–23, 1984 pp. 180–185.
Slack, "Nonmetallic Crystals with High Thermal Conductivity", J. Phys. & Chem. Solids, 34, pp. 321–335, 1973.

Primary Examiner—William R. Dixon, Jr.
Assistant Examiner—Karl Group
Attorney, Agent, or Firm—Oblon, Fisher, Spivak, McClelland & Maier

[57] ABSTRACT

According to the present invention, there is provided an aluminum nitride sintered body having a high thermal conductivity and essentially consisting of a AlN single-phase, containing 0.01 to 8,000 ppm of rare earth elements and less than 2,000 ppm of oxygen. According to the present invention, there is provided a method of fabricating an aluminum nitride sintered body having a high thermal conductivity and essentially consisting of AlN single-phase, containing 0.01 to 8,000 ppm of rare earth elements and less than 2,000 ppm of oxygen, wherein a molded body prepared by mixing and molding an aluminum nitride power having less than 7 wt % of oxygen and an average particle size of 0.05 to 5 μm and with rare earth compounds of 0.01 to 15 wt % of based on rare earth elements content, or a sintered AlN body containing oxide grain boundary phases of 0.01 to 15 wt % of rare earth elements and 0.01 to 20 wt % of oxygen and (rare earth element)—Al—O compounds phases and/or (rare earth element)—O compounds phases, is fired in a reducing atmosphere at a temperature of 1,550 to 2,050° C. for 4 hours or more.

25 Claims, 10 Drawing Sheets

3μm

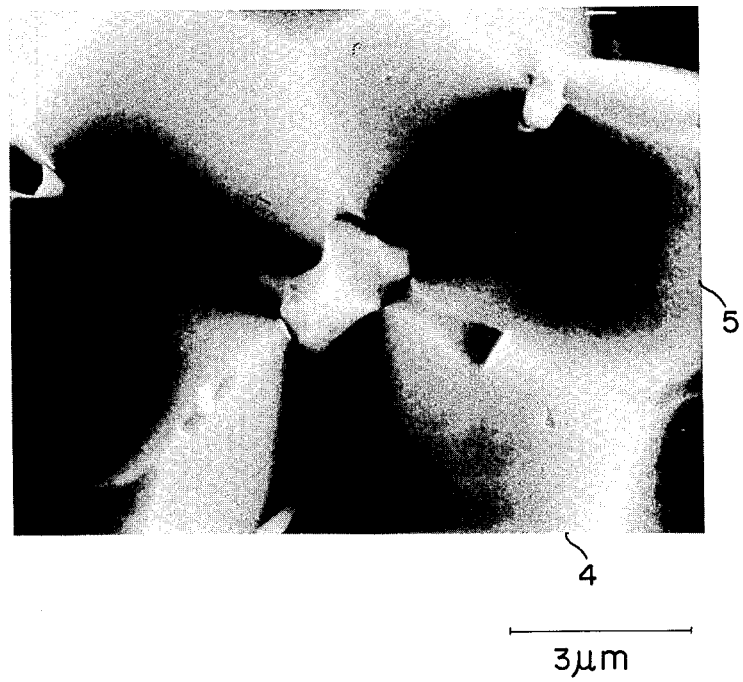
F I G. 6

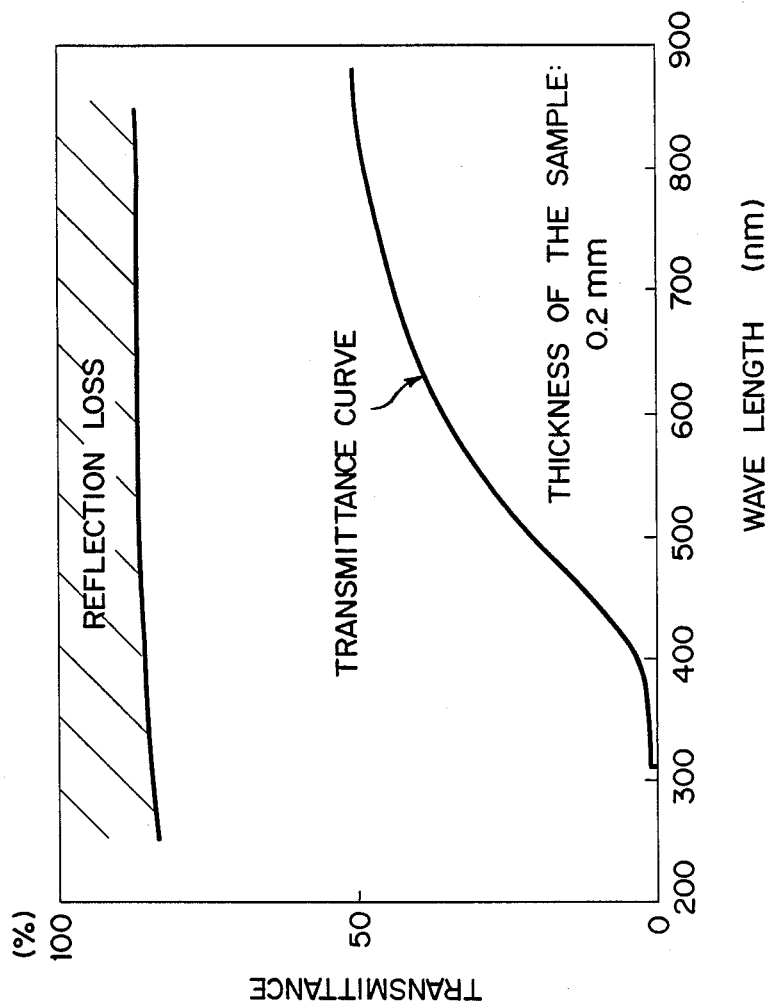
F I G. 9

ALN SINTERED BODY HAVING HIGH THERMAL CONDUCTIVITY AND A METHOD OF FABRICATING THE SAME

BACKGROUND OF THE INVENTION

Aluminum nitride does not have a melting point under normal pressure and is decomposed at a temperature of 2,500° C. or higher. Aluminum nitride is therefore used as a sintered body except single-crystal thin films.

The mechanical strength of an aluminum nitride (AlN) sintered body is rarely degraded at high temperatures, and its durability against some chemicals is excellent. The aluminum nitride sintered body is used as a heat-resistive material due to the above properties. The aluminum nitride sintered body is also promising as a radiating material of a semiconductor device due to its high thermal conductivity, and a circuit board insulating material due to its good electric insulation properties An aluminum nitride sintered body is normally obtained by molding and firing an aluminum nitride powder. When a very fine AlN powder (particle size: 0.3 μm or less) is used, a substantially full-densed AlN sintered body can be obtained without using a sintering additive. However, since oxygen in an oxide layer on the surface of the raw powder consolidates into the AlN lattice during sintering or transforms to Al—O—N compounds, the maximum thermal conductivity of the sintered body without using any sintering additive is about 100 W/m·K. When an AlN powder (particle size: 0.5 μm or more) is used, the sintering properties are not so good. It is therefore difficult to obtain a full-densed sintered body without adding a sintering additive in a method excluding hot pressing In order to obtain an AlN sintered body at normal pressure, a rare earth metal oxide or an alkali earth metal oxide is added as a sintering additive to increase the density of the sintered body and prevent impurity oxygen in the surface layer of the AlN material powder from consolidation (Japanese Patent Disclosure Nos. 60-127267, 61-10071, and 60-71575). Since such a sintering additive is reacted with impurity oxide in the surface layer of the AlN raw powder to promotes a liquid phase sintering, the density of the sintered body can be increased. Also, impurity oxygen is fixed (oxygen trapping) as grain boundary phases outside the AlN grains, thereby a high thermal conductivity can be performed.

When a sintering additive is added to the AlN raw powder, the density and thermal conductivity of the resultant AlN sintered body are improved. However, the thermal conductivity is only a maximum of about 150 W/m·K due to grain boundary oxide phases (i.e., second phases with respect to the AlN phase as the main phase) produced as a result of addition of the sintering additive and the incompletely trapped oxygen atoms. This thermal conductivity is much lower than AlN's theoretical thermal conductivity of 320 W/m·K.

Various attemps have been made to improve the thermal conductivity of an aluminum nitride sintered body. But not satisfactory results have been obtained.

SUMMARY OF THE INVENTION

It is an object of the present invention to provide an aluminum nitride sintered body excellent in thermal conductivity.

According to the present invention, there is provided an aluminum nitride sintered body having a high thermal conductivity and essentially consisting of AlN single-phase, containing 0.01 to 8,000 ppm (weight ratio; this applies to all ppm's occurring in the following description unless otherwise indicated) of rare earth elements and less than 2,000 ppm of oxygen.

According to the present invention, there is provided a method of fabricating an aluminum nitride sintered body having a high thermal conductivity and essentially consisting of AlN single-phase, containing 0.01 to 8,000 ppm of rare earth elements and less than 2,000 ppm of oxygen, wherein a molded body prepared by mixing and molding an aluminum nitride powder having less than 7 wt (abbreviation of weight) % of oxygen and an average particle size of 0.05 to 5 μm and rare earth compounds of 0.01 to 15 wt % based on rare earth elements content, or a sintered body containing AlN as a main phase with 0.01 to 15 wt % of rare earth elements and 0.01 to 20 wt % of oxygen and (rare earth element)—Al—O compounds phases and/or (rare earth element)—O compounds phases, is fired in a reducing atmosphere at a temperature of 1,550° to 2,050° C. for 4 hours or more.

From the viewpoint of improvement in thermal conductivity, the content of the rare earth elements is preferably 0.01 to 1,000 ppm, and that of impurity oxygen is preferably less than 1,000 ppm. From the viewpoint of practical applications, the content of the rare earth elements is preferably 10 to 3,000 ppm. The content of impurity oxygen in the sintered body and the content of impurity cations in raw powders must be minimized because they cause degradation of thermal conductivity if contained in large amounts.

The density of the AlN sintered body according to the present invention is preferably 3.120 to 3.285 g/cm$^3$ If the density is lower than these values, the sintered body cannot be sufficiently densed. However, if the density is higher than these values, the content of the impurity component is undesirably increased. The density of the sintered body preferably falls within the range of 3.259 to 3.264 g/cm$^3$.

A method of fabricating the sintered body according to the present invention includes the following major factors: purity and average particle size of aluminum nitride raw powder, a sintering additive, a sintering time, and a sintering atmosphere.

Use is made as a major constituent of an aluminum nitride raw powder with oxygen content of 7 wt % or less, or practically that of 0.01 to 7 wt %, and with an average particle size of 0.05 to 5 μm.

Rare earth compounds (compounds of Y, Sc, Ce, and Dy; in particular, yttrium compounds are preferable) are used as sintering additives. Examples of the rare earth element compounds are oxides, nitrides, fluorides, oxyfluorides, oxynitrides of rare earth elements, or compounds which can be into such compounds by sintering. The compounds which can be converted into such compounds by sintering are for example, carbonates, nitrates, oxalates, or hydrides of rare earth elements.

0.01 to 15 wt % of rare earth compounds are added on the bases of rare earth elements content. If the content is less than 0.01 wt %, the sintered body cannot be fully densed and oxygen may be consolidated into AlN grains. A sintered body having a high thermal conductivity cannot be obtained in such a case. However, if the content exceeds 15 wt %, the boundary phase remains in the sintered body and a single-phase AlN sintered body cannot be obtained. Since the volume of the grain boundary phases is large, voids are left in the sintered body when the grain boundary phases are removed by sintering. Also the degree of shrinkage is greatly increased, and the sintered body may be undesirably deformed. More preferably, the content of the rare earth compounds falls within the range of 0.5 to 10 wt %.

According to the method of the present invention, a molded body containing a mixture of such an AlN powder and rare earth compounds may be sintered under conditions to be described later. Alternatively, a sintered body containing AlN as a main phase, containing 0.01 to 15 wt % of rare earth elements and 0.01 to 20 wt % of oxygen, a (rare earth elements)—Al—O compounds phases, and/or a (rare earth elements)—O compounds phases are prepared by the conventional method (for example, Japanese Patent Disclosure No. 61-117160) and may be fired in place of the above molded body.

Sintering is performed in a reducing atmosphere, and in particular, an atmosphere containing nitrogen gas. The reducing atmosphere preferably contains at least one of CO gas, $H_2$ gas, and C (gaseous or solid phase).

When the material is sintered in an oxidizing atmosphere, grain boundary phase purification by carbon in particular is not effected and a high thermal conductivity cannot be obtained due to a consolidation of oxygen and production of a variant phase. The sintering atmosphere may be a low pressure, a high pressure, or normal pressure.

The sintering temperature falls within the range of 1,550° to 2,050° C. and preferably 1,700° to 2,050° C. If the sintering temperature is less than 1,550° C., a full-densed sintered body is rarely prepared. Furthermore, since generation (to be described later) of carbon gas from the sintering chamber is reduced, the grain boundary phase oxides remains. However, if the sintering temperature exceeds 2,050° C., the vapor pressure of AlN itself is increased and the resultant sintered body cannot be densed. In addition, an aluminum carbonate ($Al_4C_3$) may be produced due to the reaction between aluminum and carbon. The (rare earth elements)—O compounds are reduced, and a nitride phase may be produced. Therefore, the sintering temperature is preferably 1,800° to 2,000° C. and more preferably 1,800° to 1,950° C.

The conventional sintering time is normally a short period of time, i.e., one to three hours. When the material is sintered in the reducing atmosphere for such a short period of time, it is possible to dense the aluminum nitride sintered body and fix oxygen atom on the surface layer of the material powder to the grain boundary phases. However, grain boundary phases exist at the edge between the AlN grains and at a triple point, and a sintered body consisting of only AlN single-phase cannot be obtained. If a carbon gas atmosphere (to be described later) is not obtained, the boundary phase may not be eliminated even if the material is sintered for a long period of time. It takes four hours or more to obtain AlN single-phase, preferably six hours or more, and more preferably 12 hours or more.

The sintering housing may be defined by an aluminum nitride, alumina, or Mo housing (Japanese Patent Disclosure No. 61-146769). When such a housing is used, (rare earth elements)—Al—O compounds phases remain in the sintered body and a sintered body having a high thermal conductivity cannot be often obtained. It is therefore preferable to use a housing in which a carbon gas atmosphere can be obtained during sintering. Such a housing may be an all-carbon housing, a carbon housing having an AlN, BN, or W bottom plate for supporting the sample, or an aluminum housing with a carbon cover. The carbon gas atmosphere is defined such that a vapor pressure in the sintering temperature range of 1,550° to 2,050° C. is $1 \times 10^6$ to $5 \times 10^2$ Pa. The carbon gas can eliminate the grain boundary phases such as the rare earth elements)—Al—O, i.e., three-elements, compounds from the sintered body. As a result, the aluminum nitride sintered body consists of AlN single-phase and has a high thermal conductivity.

The inner volume of the sintering chamber is determined such that a ratio (inner volume/volume of the sintering material) is $1 \times 10^0$ to $1 \times 10^7$. If the inner volume exceeds the above range, the carbon vapor pressure near the sample is decreased, and grain boundary phases elimination effect by carbon is degraded. The volume ratio preferably falls within the range of $5 \times 10^0$ to $1 \times 10^5$.

An improving effect of the thermal conductivity of the aluminum nitride sintered body according to the present invention and purification of the aluminum nitride sintered body which is effected by the elimination of grain boundary phases such as the (rare earth elements)—Al—O compounds phases will be described below. A strict mechanism of the above phenomena is not yet clarified at present. An improving factor of thermal conductivity can be estimated as follows, according to the extensive studies by the present inventors.

A trapping effect of impurity oxygen in the AlN raw powder by an addition of rare earth elements will be described below. When rare earth compounds are added as a sintering additive, impurity oxygen can be fixed or trapped at the edge between the AlN grains and at the triple point in the form of a (rare earth elements)—Al—O compounds or the likes. Therefore, the consolidation of oxygen in the AlN lattice can be prevented, and production of an oxynitride (AlON) of AlN and poly-type AlN (27R-type) can be prevented. According to the extensive studies by the present inventors, sintered bodies containing AlON and 27R-type have low thermal conductivities. Therefore, if the cause for preventing high thermal conductivity is eliminated, a sintered body having a high thermal conductivity can be prepared.

If Y is selected as a rare earth element, impurity oxygen in the raw powder is trapped as compounds such as $3Y_2O_3 \cdot 9 5Al_2O_3$, $Y_2O_3 \cdot 9 Al_2O_3$ and $2Y_2O_3 \cdot Al_2O_3$. Trapping occurs in the initial three hours during sintering, and the thermal conductivity can reach a maximum of about 150 w/m·K.

When three hours have elapsed after the start of sintering, the (rare earth elements)—O compounds (e.g., $Y_2O_3$) and/or the (rare earth elements)—Al—O compounds (e.g., $2Y_2O_3 \cdot 9 Al_2O_3$) on the surface of the sintered body are reduced and nitrified by nitrogen gas, carbon gas, and/or CO gas present in the reducing atmosphere and are converted into (rare earth elements)—N compounds (e.g., YN) and/or AlN.

A concentration gradient occurs in the (rare earth elements)—O compounds and/or the (rare earth elements)—Al—O compounds by the reducing/nitrifying reaction on the surface of the sintered body. The concentration gradient causes the second phase excluding AlN to shift to the surface of the sintered body through the boundaries. Consequently, the sintered body consists of only AlN single-phase free from the second phases, thereby greatly increasing the thermal conductivity. This is because the grain boundary phases, acting as a thermal resistance are eliminated. AlN grains in the sintered body are grown during sintering for 4 hours or more. When the AlN grains are grown, the number of boundaries serving as a thermal resistance is comparatively reduced, and the resultant sintered body has a high thermal conductivity which has less phonon scattering.

By properly selecting other conditions of the present invention, an AlN sintered body having a transmittance for near ultraviolet rays can be obtained.

An aluminum nitride powder having a crystal lattice constant (498.00 to 498.20 pm) of the c-axis of the hexagonal crystal lattice is used as a raw powder, and yttrium compounds and yttrium fluoride are used as sintering additives. The resultant mixture is sintered in a nitrogen atmosphere containing carbon gas of $1 \times 10^{-6}$ to $5 \times 10^{-4}$ and having a nitrogen pressure of 70 to 760 Torr at a temperature of 1,850° C. to 1,950° C. for 4 hours or more. The resultant polycrystalline body has a small content of variant phases as compared with a conventional aluminum nitride polycrystalline body (sintered body). The sintered body of the present invention contains very pure and fully densed grains and has a transmittance for a wavelength range of a near ultraviolet region of 300 nm or more to visible region of 850 nm.

Conditions necessary for a high transmittance for the near ultraviolet rays (300 to 400 nm) in the AlN sintered body are given such that the sintered body is a polycrystalline body consisting of hexagonal aluminum nitride crystal grains, that the crystal lattice constant of the polycrystalline body along the c-axis is 497.98 to 498.20 pm, that the amount of variant phases at the grain boundaries is less than 2 wt %, that the porosity is 1% or less, that the density of the polycrystalline body is 3.255 to 3.275 g/cm$^3$, that the oxygen content is 0.2 wt % or less, and that the content of transition metal elements (Mn, Tc, Re, Fe, Co, Ni, Ru, Rh, Pd, Os, Ir, and Pt) belonging to the Groups VIIa and VIIIa of the Periodic Table is 0.1 wt % or less.

The resultant aluminum nitride sintered body has a high transmittance in a light energy region including a near ultraviolet region since the physical/chemical purity of the crystal grains is very high, i.e., the amount of lattice defects and impurity is very small, and since the crystal lattice constant (497.95 to 498.20 pm) of hexagonal crystal type aluminum nitride along the c-axis is similar to that (498.16 pm) of the perfect AlN single crystal.

The above result is obtained by the method wherein a raw powder consisting of aluminum nitride crystal grains containing a very small amount of consolidated oxygen and cationic impurity is used, oxygen and the cationic impurity are not consolidated into aluminum nitride grains during sintering, and the cationic impurity in the form of a solid solution is eliminated outside the polycrystalline body.

Light absorption and scattering within the crystal grains in the polycrystalline body are small. Ultraviolet absorption caused by consolidated oxygen in the AlN crystal grains and the lattice defects generated by the consolidated oxygen is also very small in the crystal grains of the polycrystalline body. Therefore, the sintered body has a wide transparent range from the near ultraviolet rays to the infrared rays. In addition, the sintered body contains a small amount of variant phase, and the porosity is very small, which contributes to an increase in transmittance.

The aluminum nitride polycrystalline body having a high transmittance described above can be obtained only when the various conditions described above are satisfied. In particular, a high transmittance for the near ultraviolet rays can be obtained when the lattice constant of the hexagonal crystal lattice along the c-axis is 497.95 to 498.20 pm, an oxygen content is at least 0.7 wt %, and a porosity is 1% or less.

BRIEF DESCRIPTION OF THE DRAWINGS

FIGS. 2, 4, and 6 are SEM photographs of fracture surfaces of the sintered bodies; and FIGS. 8 and 9 are graphs showing transmittance characteristics.

DETAILED DESCRIPTION OF THE PREFERRED EMBODIMENTS

Example 1

$Y_2O_3$ having an average particle size of 0.9 μm were added 4 wt % based on yttrium element as a sintering additive to an AlN powder containing 1.0 wt % of oxygen as an impurity and having an average particle size of 0.6 μm, and were mixed therewith by using a ball mill, thereby preparing a material. Four wt % of an organic binder were added to the material and the resultant mixture was granulated and pressed at a pressure of 500 kg/cm$^2$, thereby preparing a compact having a size of $38 \times 38 \times 10$ mm. Pressing may be performed by mold pressing, hydrostatic pressing, or tape casting. The compact was heated to 700° C. in a nitrogen gas atmosphere to eliminate the binder, thereby obtaining a degreased body. The degreased body was placed in a carbon housing (sintering housing A) having an AlN bottom plate coated with a BN powder. Housing A has a size of 12 cm in diameter and 6.4 cm in height (to be referred to as a 12 cm$\phi \times 6.4$ cm hereinafter). The inner volume of the housing is 720 cm$^3$. The ratio of the inner volume of housing A to the volume of the AlN sintered body is about $5 \times 10^1$. The material was sintered in the housing in the nitrogen gas atmosphere at a temperature of 1,900° C. and normal pressure for 96 hours. The density and particle size of the resultant AlN sintered body were measured. Results are summarized in Table 1. A disk having a diameter of 10 mm and a thickness of 3.3 mm was prepared by cutting out the sintered body and served as a test sample. The thermal conductivity of the sample was measured by a laser flash method (use of TC-3000 available from Shinku Riko). A measuring temperature was 25° C. A result is also summarized in Table 1. The aluminum nitride sintered body of Example 1 has a very high thermal conductivity of more than 200 W/m·K.

Figure 2:
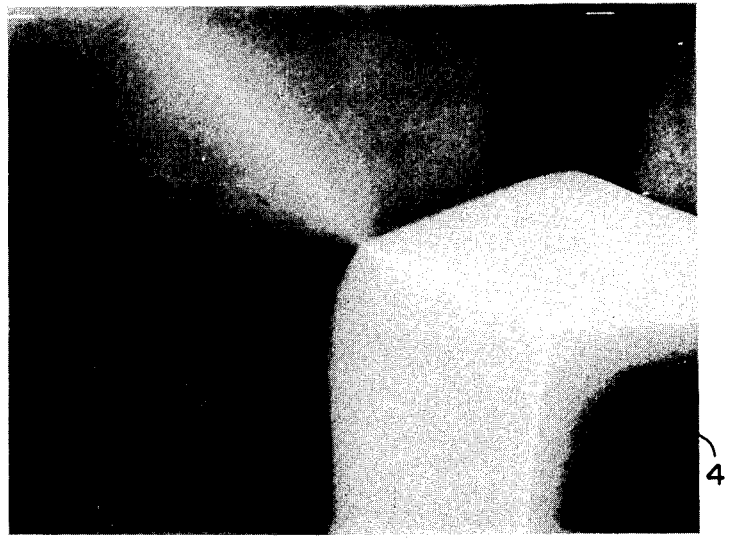

Elemental analysis of the resultant sintered body was also performed. Yttrium was analyzed by an ICP spectroscopic method (use of SPS-1200A available from Seiko Denshi Kogyo). The cationic impurity was measured by a chemical analysis. Impurity oxygen was measured by a neutron activation analysis (use of NAT-200-IC available from TOSHIBA) The sintering conditions and the properties of the sintered body are summarized in Table 1. X-ray diffraction (use of Rotor Flex RU-200 available from Rigaku Denki; goniometer CN2173D5; X-ray source of Cu, 50 kV and 100 mA) of the sintered body was performed. Results are summarized in Table 1 and the corresponding SEM photograph of the sintered body fracture surface is shown in FIG. 2 (use of JSM-T20 available from Nihon Denshi).

Figure 1:
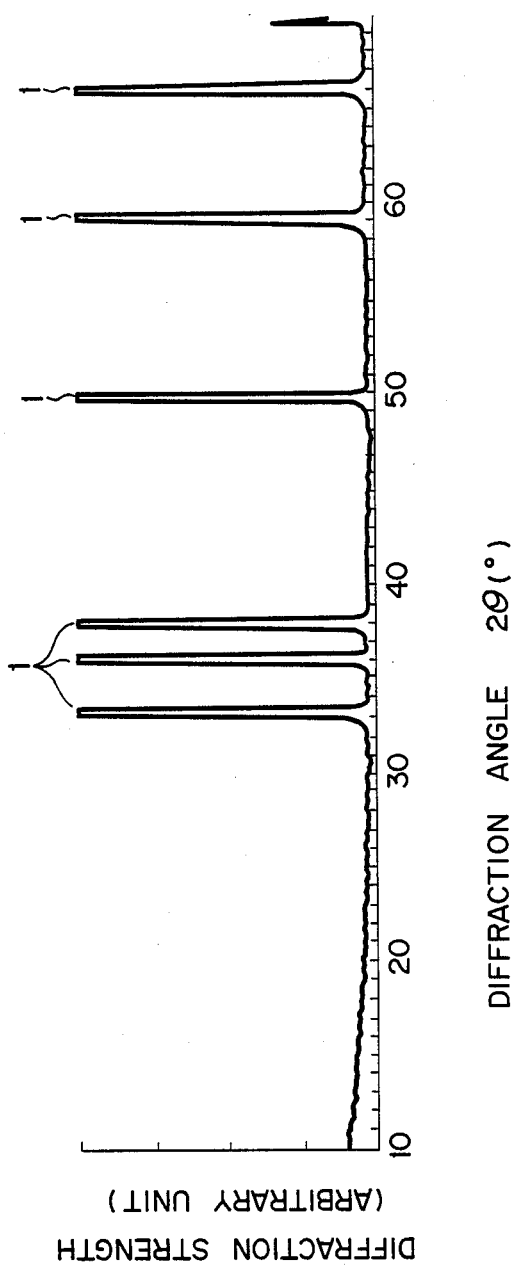
FIGS. 1, 3, 5, 7 and 10 are graphs showing X-ray diffraction patterns of the sintered body.

The AlN sintered body of the present invention consists of only AlN crystal grains, and other phases are not observed. Reference numerals 1 in FIG. 1 and 4 in FIG. 4 denote an AlN diffraction peak and AlN grains, respectively.

Examples 2-6

AlN sintered bodies were prepared following the same procedures as in Example 1, except that the contents of the sintering additives were changed. The properties of the sintered bodies were evaluated following the same procedures as in Example 1. Results are summarized in Table 1.

Examples 7 and 8

AlN sintered bodies were prepared following the same procedures as in Example 1, except that the contents of the sintering additives and the sintering temperatures were changed. The properties of the sintered bodies were evaluated following the same procedures as in Example 1. Results are summarized in Table 1.

Examples 9 and 10

AlN sintered bodies were prepared following the same procedures as in Example 1, except that the sintering temperatures were changed. The properties of the sintered bodies were evaluated following the same procedures as in Example 1. Results are summarized in Table 1.

Example 11

An AlN sintered body was prepared following the same procedures as in Example 1, except that the particle size of the AlN raw powder, the content of impurity oxygen, and the sintering temperature were changed. The properties of the sintered body were evaluated following the same procedues as in Example 1. Results are summarized in Table 1.

Examples 12 and 13

AlN sintered bodies were prepared following the same procedures as in Example 1, except that the contents of the sintering additives, the sintering temperatures, and the sintering atmospheres were changed. The properties of the sintered bodies were evaluated following the same procedures as in Example 1. Results are summarized in Table 1.

Example 14

An AlN sintered body was prepared following the same procedures as in Example 1, except that the content of the sintering additive, the sintering temperature, and the sintering time were changed. The properties of the sintered body were evaluated following the same procedures as in Example 1. Results are summarized In Table 1.

Examples 15-17

AlN sintered bodies were prepared following the same procedures as in Example 1, except that the sintering times were changed. The properties of the sintered bodies were evaluated following the same procedures as in Example 1. Results are summarized in Table 1.

Example 18

$Y_2O_3$ (1 wt % based on yttrium element) having an average grain size of 0.9 μm was added as a sintering additive to an AlN powder containing 1.5 wt % of oxygen and an average particle size of 1.5 μm. Molding and degreasing were performed following the same procedures as in the previous examples. Housing A having the same material as in Example 1 was used. The inner size of the housing was 38.5×38.5×10.7 mm. By using this housing, the material was sintered in nitrogen gas of 10 atm at a temperature of 1,800° C. for 24 hours. The resultant sintered body was evaluated following the same procedures as in Example 1. Results are summarized in Table 1.

Example 19

An AlN sintered body was prepared following the same procedures as in Example 18, except that sintering housing A having an inner size of 43×44×15 mm was used and the sintering time was changed. The resultant sintered body was tested following the same procedures as in Example 1. Results are summarized in Table 1.

Example 20

The process up to degreasing was performed following the same procedures as in Example 1 to prepare a material. The material was sintered in sintering housing A of 700 mmφ×380 mm in a nitrogen gas of low-pressure atmosphere (0.1 atm) at 1,900° C. for 192 hours. The properties of the resultant sintered body were evaluated following the same procedures as in Example 1. Results are summarized in Table 1.

Example 21

An AlN sintered body was prepared following the same procedures as in Example 20, except that sintering housing A of 15 mmφ×6 mm was used and the sintering time was changed. The resultant sintered body was ested following the same procedures as in Example 1. Results are summarized in Table 1.

Example 22

An AlN sintered body was prepared following the same procedures as in Example 1, except that sintering carbon housing (sintering housing B) having a BN bottom plate was used. The resultant sintered body was tested following the same procedures as in Example 1. Results are summarized in Table 1.

Example 23

An AlN sintered body was prepared following the same procedures as in Example 22, except that the particle size of the AlN raw powder and the content of impurity oxygen were changed. The properties of the resultant sintered body were evaluated following the same procedures as in Example 1. Results are summarized in Table 1.

Example 24

An AlN sintered body was prepared following the same procedures as in Example 1, except that a carbon housing (sintering housing C) having a carbon internal wall was used. The properties of the resultant sintered body were evaluated following the same procedures as in Example 1. Results are summarized in Table 1.

Example 25

An AlN sintered body was prepared following the same procedures as in Example 24, except that the particle size of the AlN raw powder and the contents of impurity oxygen were changed. The properties of the resultant sintered body were evaluated following the same procedures as in Example 1. Results are summarized in Table 1.

Example 26

An AlN sintered body was prepared following the same procedures as in Example 1, except that the sintering temperature, the sintering time, and the sintering atmosphere were changed. The properties of the resultant sintered body were evaluated following the same procedures as in Example 1. Results are summarized in Table 1.

Example 27

An AlN sintered body was prepared following the same procedures as in Example 1, except that the sintering time was changed and the sintering atmosphere was changed to a low pressure (0.1 atm) of an $N_2+H_2$ (5%) atmosphere. The properties of the resultant sintered body were evaluated following the same procedures as in Example 1. Results are summarized in Table 1.

Examples 28–34

AlN sintered bodies were prepared following the same procedures as in Example 1, except that added cations were changed to various rare earth elements. The properties of the resultant sintered bodies were evaluated following the same procedures as in Example 1. Results are summarized in Table 2.

Examples 35–142

Various conditions were changed to prepare AlN sintered bodies, and their properties were evaluated following the same procedures as in Example 1. Results are summarized in Table 3.

Example 143

$Y_2O_3$ (5 wt % based on yttrium element) having an average particle size of 0.9 μm and 1 wt % of $YF_3$ were added as sintering additives to an AlN powder having a lattice constant (498.07 pm) of the hexagonal crystal lattice along the c-axis, containing 1.0 wt % of oxygen as an impurity, and having an average particle size of 1.9 μm and were mixed therewith by using a ball mill, thereby preparing a material. Four wt % of an organic binder was mixed with the material and the resultant mixture was granulated. The granulated mixture was pressed at a pressure of 1,000 kg/cm² to prepare a compact having a size of 38×38×10 mm. This compact was heated to 700° C. in the nitrogen gas atmosphere to eliminate the binder (i.e., degreasing). The degreased body was placed in a carbon housing (sintering housing A) having an AlN bottom plate coated with a BN powder. Housing A has a size of 12 cmφ×6.4 cm and has an inner volume of 720 cm³. The ratio of the inner volume of housing A to the volume of the AlN sintered body is about $5\times10^1$. The material was sintered in a nitrogen gas atmosphere (700 Torr) at 1,870° C. and normal pressure for 200 hours. The density and particle size of the resultant AlN polycrystalline body were measured. A disk having a diameter of 10 mm and a thickness of 3.0 mm was prepared by cutting out the polycrystalline body and served as a test sample. The thermal conductivity of the sample was measured by a laser flash method (use of TC-3000 available from Shinku Riko) The measuring temperature was 25° C.

Figure 8:
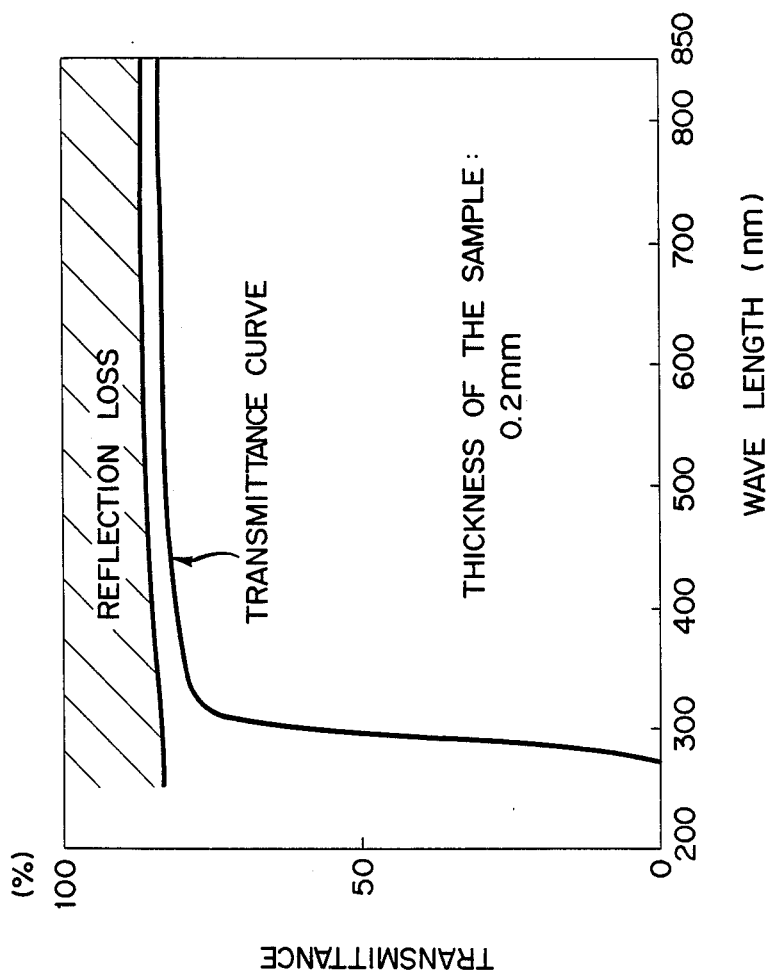

The lattice constants of the aluminum nitride material powder and the aluminum nitride polycrystalline body were measured by Rotor Flex Ru-200 and Goniometer CN2173D5 available from Rigaku Denki after 10 to 20 wt % of Si powder (NBS SRM640 Standard Sample) were mixed to the powder or pulverized polycrystalline powder. In this case, the X-ray source of Cu $K_{\alpha 1}$, 50 kV, and 150 mA was used. Angular correction was performed by using two Si diffraction peak values in the range of $100°<2\theta<126°$ and six diffraction peaks of hexagonal aluminum nitride in the range of $100°<2\theta<126°$, and by calculating according to the method of least squares. The measuring temperature was 25° C. ±1° C. It is known that the values of the calculated lattice constants include errors of ±0.05 pm. The content of oxyen in the polycrystalline body was analyzed by neutron activation analysis (use of NAT-200-IC available from TOSHIBA). Elemental analysis of the polycrystalline body was performed according to a spectroscopic method (use of SPS-1200A available from Seiko Denshi Kogyo) and wet chemical analysis. The porosity and the particle size of the polycrystalline body were measured according to the SEM photograph (use of JSM-T20 available from Nihon Denshi), and the transmittance of the polycrystalline body was measured as follows. A polycrystalline sample (diameter: 20 mm to 12 mm) having a thickness of 0.1 to 0.5 mm and prepared by cutting out the above polycrystalline body was used and its transmittance was measured by placing an integrating sphere in a Cary 17 autorecording spectrophotometer (FIG. 8).

The density of the polycrystalline body was measured by a buoyancy as an apparent density obtained by a difference between the weight of the polycrystalline body in air and that in distilled water.

The preparation conditions of the polycrystalline body are summarized in Table 4, and the properties of the polycrystalline body are summarized in Table 5.

The preparation conditions and the properties of the polycrystalline bodies (Examples 144 to 146) are also summarized in Tables 4 and 5, respectively.

Controls 1–7

AlN degreased bodies prepared following the same procedures as in Example 143 were set in sintering housing A or AlN housing D and were sintered in an $N_2$ atmosphere at 1,800° to 1,950° C. and normal pressure for 2 to 200 hours, thereby preparing sintered polycrystalline bodies. The preparation conditions of these polycrystalline bodies and their properties are summarized in Tables 4 and 5, respectively. A measurement result of the transmittance of the polycrystalline body in Control 1 is shown in FIG. 9. Since the lattice constant along the c-axis of the hexagonal crystal lattice is less than 497.85 pm, the polycrystalline body has a low transmittance and its thermal conductivity is less than 195 W/m·K.

In order to obtain an AlN sintered body having a high thermal conductivity, it is apparent that the lattice constant of the aluminum nitride material powder is 498.00 to 498.20 pm along the c-axis of the hexagonal crystal lattice and that the $YF_3$ sintering additive must be added and sintering must be performed in the carbon reducing atmosphere for a long period of time (4 hours or more).

Comparative Examples 1–3

Figure 3:
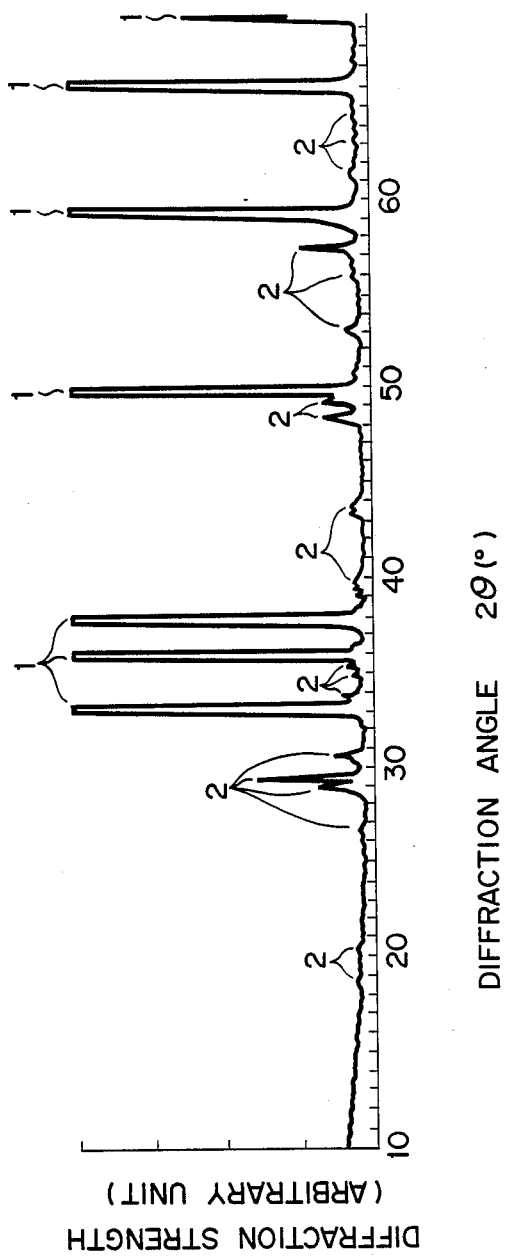
Figure 4:
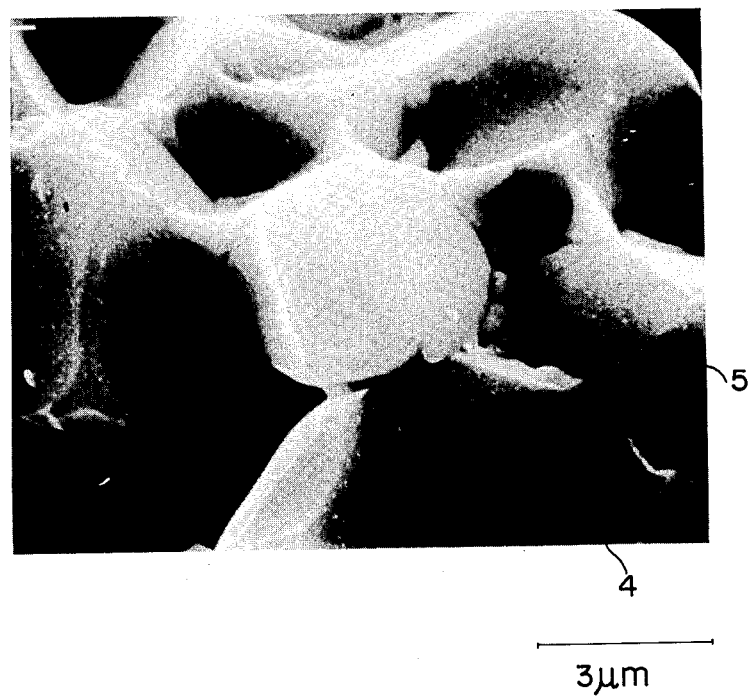

AlN sintered bodies prepared following the same procedures as in Example 1 were set in sintering housings A, B, and C and were sintered in an $N_2$ gas atmosphere at 1,900° C. and normal pressure for 2 hours, thereby obtaining sintered bodies. The properties of these sintered bodies are summarized in Table 6. An X-ray diffraction result of the sintered body is shown in FIG. 3. Reference numeral 2 denotes a Y—Al—O compound diffraction peak. An SEM photograph of its cut surface is shown in FIG. 4. Reference numeral 4 denotes AlN grains; and 5, a Y—Al—O compound (boundary phase). According to these results, a compound containing yttrium as a second phase is observed, and the resultant sintered body does not consist of only single-phase AlN. Therefore, the thermal conductivity of the sintered body is 170 W/m·K or less.

If the sintering time is shorter than 4 hours, elimination of the boundary phase by using the carbon housing is insufficient. Therefore, it is apparent that long-period (4 hours or more) sintering is required to obtain an AlN sintered body having a high thermal conductivity.

Comparative Examples 4–6

Figure 5:
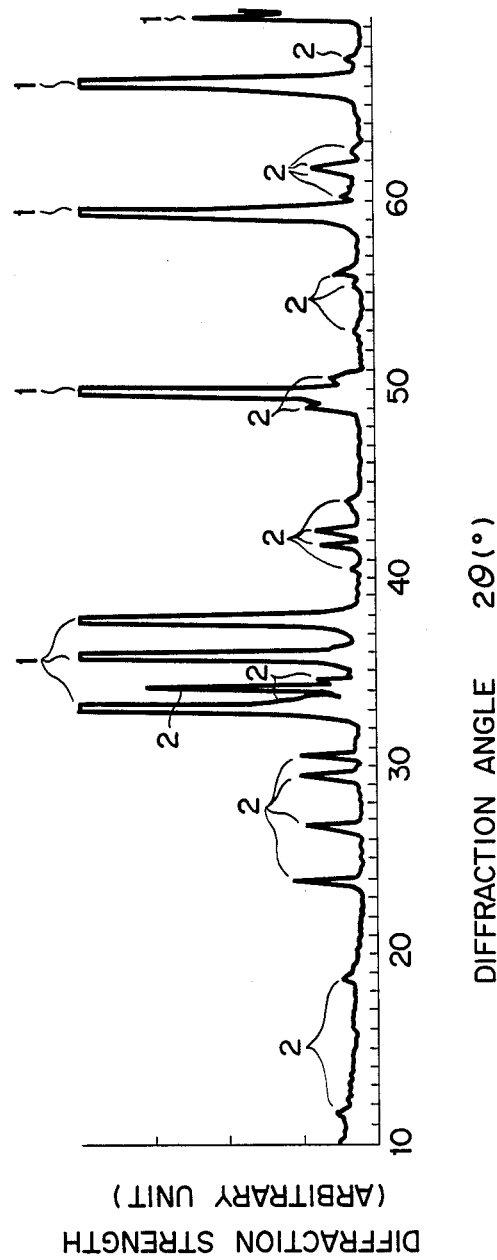
Figure 7:
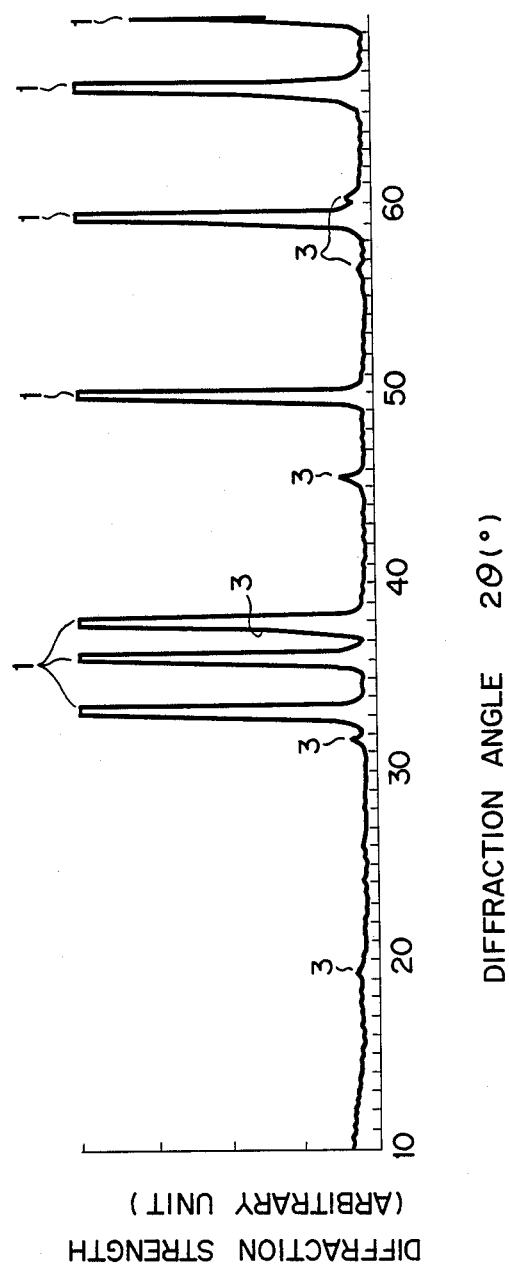

AlN degreased bodies prepared following the same procedures as in Example 1 were placed in an AlN housing (sintering housing D) having an AlN inner wall for Comparative Example 4, an alumina housing (sintering housing E) having an alumina inner wall for Comparative Example 5, and a tungsten housing (sintering housing F) having a tungsten inner wall for Comparative Example 6 and were sintered in an $N_2$ gas atmosphere at 1,900° C. and normal pressure for 96 hours, thereby obtaining sintered bodies. The properties of these sintered bodies are summarized in Table 6. An X-ray diffraction result of the sintered body in Comparative Example 4 is shown in FIG. 5, and an SEM photograph of its fracture surface is shown in FIG. 6. Reference numerals 2 and 3 denote peaks of the Y—Al—O and Al—O—N compounds. A compound containing yttrium as a second phase is observed and the resultant sintered body does not consist of only single-phase AlN. Its thermal conductivity is 168 W/m·K or less.

When sintering housings whose internal parts are at least partially made of carbon are not used, an AlN sintered body having a high thermal conductivity cannot be prepared. It is therefore important to use the carbon atmosphere.

Comparative Example 7

An AlN powder as used in Example 1 was press-molded at a pressure of 500 kg/cm² to obtain a compact having a size of 30×30×10 mm. This compact was placed in a carbon housing and hot-press sintered in the nitrogen gas atmosphere at 1,900° C. and a pressure of 400 kg/cm2 for an hour, thereby obtaining a sintered body. The properties of the sintered body are summarized in Table 6. An X-ray diffraction result of this sintered body is shown in Table 7. Al—O—N compound 3 as a second phase is observed and the resultant sintered body is found not to consist of only single-phase AlN. The thermal conductivity of the sintered body was as low as 80 W/m·K.

When a rare earth compound is not added, AlN is reacted with impurity oxygen on the surface of the AlN material powder to undesirably produce the Al—O—N compound which degrades the thermal conductivity. It is therefore very important to add the rare earth compound to the AlN material.

Example 201

$Y_2O_3$ (4 wt % based on yttrium element) having an average grain size of 0.9 μm were added as a sintering additive to an AlN powder containing 1.2 wt % of oxygen as an impurity and having an average particle size of 0.8 μm, and were mixed therewith by using a ball mill, thereby preparing a material. Four wt % of an organic binder were added to the material and the resultant mixture was granulated and pressed at a pressure of 500 kg/cm², thereby preparing a compact having a size of 38×38×10 mm. The compact was heated to 700° C. in a nitrogen gas atmosphere to eliminate the binder, thereby obtaining a degreased body. The degreased body was placed in a carbon housing (sintering housing A) having an AlN bottom plate coated with a BN powder. Housing A has a size of 12 cmφ×6.4 cm. The inner volume of the housing is 430 cm³. The ratio of the inner volume of housing A to the volume of the AlN sintered body is about $3\times10^1$. The material was sintered in the housing in the nitrogen gas atmosphere at a temperature of 1,950° C. for 24 hours. The density and particle size of the resultant AlN sintered body were measured. Results are summarized in Table 7 (Part I). A disk having a diameter of 10 mm and a thickness of 3.3 mm was prepared by cutting out the sintered body and served as a test sample. The thermal conductivity of the sample was measured by a laser flash method (use of TC-3000 available from Shinku Riko). A measuring temperature was 25° C. A result is also summarized in Table 7 (Part I). The aluminum nitride sintered body of Example 1 has a very high thermal conductivity of more than 200 W/m·K.

Figure 10:
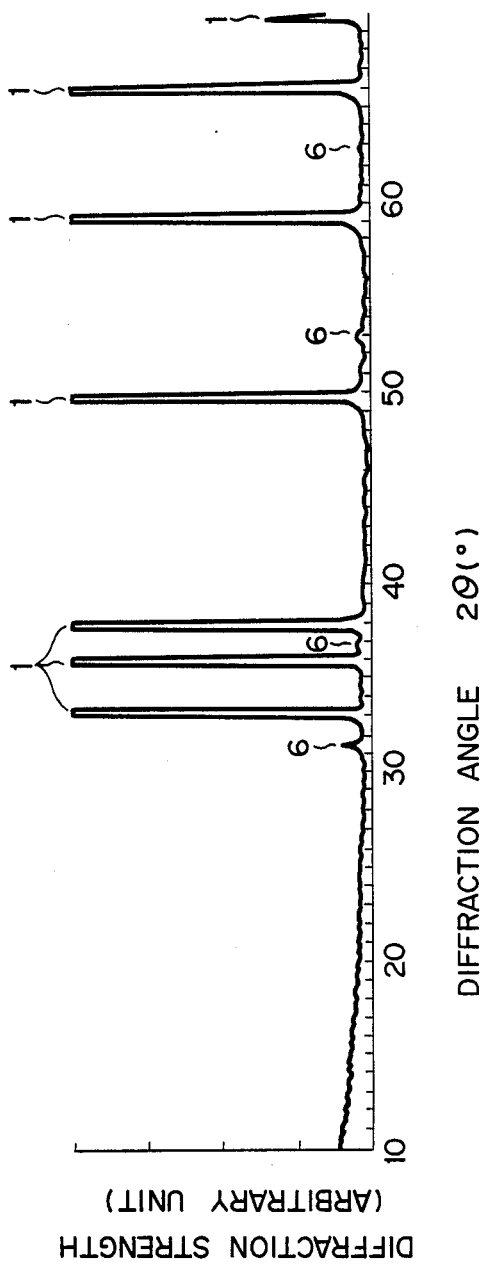

Elemental analysis of the resultant sintered body was also performed. Yttrium was analyzed by an ICP spectroscopic method (use of SPS-1200A available from Seiko Denki Kogyo). The cationic impurity was measured by a chemical analysis. Impurity oxygen was measured by a neutron activation analysis (use of a 160-cm cyclotron available from Rikagaku Kenkyusho). The sintering conditions and the properties of the sintered body are summarized in Table 7 (Part I). X-ray diffraction (use of Rotor Flex RU-200 available from Rigaku Denki; goniometer CN2173D5; X-ray source of Cu 50 kV and 100 mA) of the sintered body was performed. Results are shown in FIG. 10. Y-N compound (reference numeral 6) was observed as a second phase. Reference numeral 1 denotes an AlN diffraction peak.

Examples 202–205

AlN sintered bodies were prepared following the same procedures as in Example 201, except that the contents of the sintering additives were changed. The properties of the sintered bodies were evaluated following the same procedures as in Example 201. Results are summarized in Table 7 (Part I).

Example 206

An AlN sintered body was prepared following the same procedures as in Example 201, except that the particle size of the AlN raw powder, the content of impurity oxygen, and the sintering temperature were changed. The properties of the sintered body were evaluated following the same procedures as in Example 201. Results are summarized in Table 7 (Part I).

Examples 207 and 208

AlN sintered bodies were prepared following the same procedures as in Example 201, except that the sintering temperatures were changed. The properties of the sintered bodies were evaluated following the same procedures as in Example 201. Results are summarized in Table 7 (Part I).

Examples 209-211

AlN sintered bodies were prepared following the same procedures as in Example 201, except that the sintering times were changed. The properties of the sintered bodies were evaluated following the same procedures as in Example 201. Results are summarized in Table 7 (Part I).

Examples 212-215

AlN sintered bodies were prepared following the same procedures as in Example 201, except that the sintering atmosphere was changed. The properties of the sintered bodies were evaluated following the same procedures as in Example 201. Results are summarized in Table 7 (Part I).

Example 216

An AlN sintered body was prepared following the same procedures as in Example 18, except that sintering housing A having an inner size of 38.5×38.5×10.7 mm was used. The resultant sintered body was tested following the same procedures as in Example 201. Results are summarized in Table 7 (Part I).

Example 217

An AlN sintered body was prepared following the same procedures as in Example 18, except that sintering housing A having an inner size of 700 mm$\phi$×380 mm was used and the sintering time was changed. The resultant sintered body was tested following the same procedures as in Example 201. Results are summarized in Table 7 (Part I).

Example 218

An AlN sintered body was prepared following the same procedures as in Example 201, except that a sintered body has a size of 15 mm$\phi$×6 mm and sintering housing A of 306 mm$\phi$×380 mm was used. The resultant sintered body was tested following the same procedures as in Example 201. Results are summarized in Table 7 (Part I).

Example 219

An AlN sintered body was prepared following the same procedures as in Example 201, except that sintering carbon housing B having a BN bottom plate was used. The resultant sintered body was tested following the same procedures as in Example 201. Results are summarized in Table 7 (Part I).

Example 220

An AlN sintered body was prepared following the same procedures as in Example 201, except that a carbon housing (sintering housing C) having a carbon internal wall was used. The properties of the resultant sintered body were evaluated following the same procedures as in Example 201. Results are summarized in Table 7 (Part I).

Comparative Examples 11-13

AlN sintered bodies prepared following the same procedures as in Example 201 were set in sintering housings A, B, and C and were sintered in an $N_2$ gas atmosphere at 1,950° C. and normal pressure for 2 hours, thereby obtaining sintered bodies. The properties of these sintered bodies are summarized in Table 7 (Part II).

If the sintering time is shorter than 4 hours, elimination of the boundary phase by using the carbon housing is insufficient. Therefore, it is apparent that long-period (4 hours or more) sintering is required to obtain an AlN sintered body having a high thermal conductivity.

Comparative Examples 14-16

AlN degreased bodies prepared following the same procedures as in Example 201 were placed in an AlN housing (sintering housing D) having an AlN inner wall for Comparative Example 14, an alumina housing (sintering housing E) having an alumina inner wall for Comparative Example 15, and a tungsten housing (sintering housing F) having a tungsten inner wall for Comparative Example 16 and were sintered in an $N_2$ gas atmosphere at 1,950° C. and normal pressure for 24 hours, thereby obtaining sintered bodies. The properties of these sintered bodies are summarized in Table 7 (Part II). Y—Al—O compounds as a second phase were observed and the thermal conductivity of the resultant sintered body was as low as 160 W/m·K or less.

When sintering housings whose internal parts are at least partially made of carbon are not used, an AlN sintered body having a high thermal conductivity cannot be prepared. It is therefore important to use the carbon (reducing) atmosphere.

Comparative Example 17

An AlN powder as in Example 1 was press-molded at a pressure of 500 kg/cm$^2$ to obtain a compact having a size of 30×30×10 mm. This compact was placed in a carbon housing and hot-press sintered in the nitrogen gas atmosphere at 1,900° C. and a pressure of 400 kg/cm$^2$ for an hour, thereby obtaining a sintered body. The properties of the sintered body are summarized in Table 7 (Part II). An Al—O—N compound as a second phase was observed and the thermal conductivity of the sintered body was as low as 77 W/m·K.

When a rare earth compound is not added, AlN is reacted with impurity oxygen on the surface of the AlN material powder to undesirably produce the Al—O—N compound which degrades the thermal conductivity. It is therefore very important to add the rare earth compound to the AlN material.

Example 221

An AlN sintered body was prepared following the same procedures as in Example 201, except that the cation of a sintering additive was replaced with Sc and $Sc_2O_3$ having an average particle size of 0.9 μm was added. The properties of the resultant sintered body were evaluated following the same procedures as in Example 201. Results are shown in Table 7 (Part III). Results in the following examples are also summarized in Table 7 (Part III).

Example 222

An AlN sintered body was prepared following the same procedures as in Example 221, except that the content of the sintering additive was changed. The properties of the resultant sintered body were evaluated following the same procedures as in Example 201.

Example 223

An AlN sintered body was prepared following the same procedures as in Example 221, except that the sintering time and temperature were changed. The properties of the resultant sintered body were evaluated following the same procedures as in Example 201.

Example 224

An AlN sintered body was prepared following the same procedures as in Example 201, except that the cation of a sintering additive was replaced with Ce and $CeO_2$ having an average grain size of 1.0 μm was added. The properties of the resultant sintered body were evaluated following the same procedures as in Example 201.

Example 225

An AlN sintered body was prepared following the same procedures as in Example 224, except that the content of the sintering additive was changed. The properties of the resultant sintered body were evaluated following the same procedures as in Example 201.

Example 226

An AlN sintered body was prepared following the same procedures as in Example 224, except that the sintering time and temperature were changed. The properties of the resultant sintered body were evaluated following the same procedures as in Example 201.

Example 227

An AlN sintered body was prepared following the same procedures as in Example 201, except that the cation of a sintering additive was replaced with Dy and $Dy_2O_3$ having an average particle size of 1.0 μm was added. The properties of the resultant sintered body were evaluated following the same procedures as in Example 201.

Example 228

An AlN sintered body was prepared following the same procedures as in Example 227, except that the content of the sintering additive was changed. The properties of the resultant sintered body were evaluated following the same procedures as in Example 201.

Example 229

An AlN sintered body was prepared following the same procedures as in Example 227, except that the sintering time and temperature were changed. The properties of the resultant sintered body were evaluated following the same procedures as in Example 201.

Example 230

An AlN sintered body was prepared following the same procedures as in Example 201, except that the cations of sintering additives were Y and Sc and 4 wt % of $Y_2O_3$ and $Sc_2O_3$ were added at an element weight ratio of Y:Sc=1:1. The properties of the resultant sintered body were evaluated following the same procedures as in Example 201.

Example 231

An AlN sintered body was prepared following the same procedures as in Example 201, except that the cations of sintering additives were Y and Ce and 4 wt % of $Y_2O_3$ and $CeO_2$ were added at an element weight ratio of Y:Ce=1:1. The properties of the resultant sintered body were evaluated following the same procedures as in Example 201.

Example 232

An AlN sintered body was prepared following the same procedures as in Example 201, except that the cations of sintering additives were Y and Dy and 4 wt % of $Y_2O_3$ and $Dy_2O_3$ were added at an element weight ratio of Y:Ce=1:1. The properties of the resultant sintered body were evaluated following the same procedures as in Example 201.

Comparative Example 18

An AlN sintered body was prepared following the same procedures as in Example 221, except that sintering housing D was used. The properties of resultant sintered body were evaluated following the same procedures as in Example 201. Results are summarized in Table 7 (Part IV). Results in the following samples are also summarized in Table 7 (Part IV).

Comparative Example 19

An AlN sintered body was prepared following the same procedures as in Example 224, except that sintering housing D was used. The properties of resultant sintered body were evaluated following the same procedures as in Example 201.

Comparative Example 20

An AlN sintered body was prepared following the same procedures as in Example 227, except that sintering housing D was used. The properties of resultant sintered body were evaluated following the same procedures as in Example 201.

Comparative Example 21

An AlN sintered body was prepared following the same procedures as in Example 227, except that sintering housing D was used. When at least internal part of the sintering housing is not made of carbon in Comparative Examples 18 to 21, an AlN sintered body having a thermal conductivity of more than 180 W/m·K cannot be obtained. It is, therefore, important to use a carbon (reducing) atmosphere.

Example 301

$Y_2O_3$ (4 wt % based on yttrium element) having an average particle size of 0.9 μm were added as a sintering additive to an AlN powder containing 1.0 wt % of oxygen as an impurity and having an average particle size of 0.6 μm, and were mixed therewith by using a ball mill, thereby preparing a material. Four wt % of an organic binder were added to the material and the resultant mixture was granulated and pressed at a pressure of 500 kg/cm², thereby preparing a compact having a size of 38×38×10 mm. The compact was heated to 700° C. in a argon gas atmosphere to eliminate the binder, thereby obtaining a degreased body. The degreased body was placed in a carbon housing (sintering housing A) having an AlN bottom plate coated with a BN powder. Housing A has a size of 10 cmφ×3.7 cm. The inner volume of the housing is 290 cm³. The ratio of the inner volume of housing A to the volume of the AlN sintered body is about $2 \times 10^1$. The material was sintered in the housing in the nitrogen gas atmosphere at a temperature of 1,950° C. and normal pressure for 24 hours. The density and particle size of the resultant AlN sintered body were measured. Results are summarized in Table 8 (Part I). A disk having a diameter of 10 mm and a thickness of 3.3 mm was prepared by cutting out the sintered body and served as a test sample. The thermal conductivity of the sample was measured by a laser flash method (use of TC-3000 available from Shinku Riko). A measuring temperature was 25° C. A result is also summarized in Table 8 (Part I). The aluminum nitride sintered body of Example 301 has a very high thermal conductivity of more than 200 W/m·K.

Elemental analysis of the resultant sintered body was also performed. Yttrium was analyzed by an ICP spectroscopic method (use of SPS-1200A available from Seiko Denshi Kogyo). The cationic impurity was measured by a chemical analysis. Impurity oxygen was measured by a neutron activation analysis (use of NAT-200-IC available from TOSHIBA). The sintering conditions and the properties of the sintered body are summarized in Table 8 (Part I). X-ray diffraction (use of Rotor Flex RU-200 available from Rigaku Denki; goniometer CN2173D5; X-ray source of Cu, 50 kV and 100 mA) of the sintered body was performed. The presence of a $YC_2$ compound was confirmed.

Example 302

An AlN sintered body was prepared following the same procedures as in Example 301, except that 7 wt % of the sintering additive was used. The properties of the sintered body were evaluated following the same procedures as in Example 301. Results are summarized in Table 8 (Part I). Results in the following examples are also summarized in Table 8 (Part I).

Example 303

An AlN sintered body was prepared following the same procedures as in Example 301, except that the sintering temperature was changed to 1,750° C. The properties of the sintered body were evaluated following the same procedures as in Example 301.

Example 304

An AlN sintered body was prepared following the same procedures as in Example 301, except that the sintering temperature and the sintering atmosphere were changed. The properties of the sintered body were evaluated following the same procedures as in Example 301.

Example 305

An AlN sintered body was prepared following the same procedures as in Example 301, except that the sintering time and the sintering atmosphere were changed. The properties of the sintered body were evaluated following the same procedures as in Example 301.

Example 306

An AlN sintered body was prepared following the same procedures as in Example 301, except that a carbon housing (sintering housing G) filled with a carbon powder was used. The properties of the sintered body were evaluated following the same procedures as in Example 301.

Example 307

An AlN sintered body was prepared following the same procedures as in Example 301, except that sintering housing C having a carbon inner wall was used. The resultant sintered body was tested following the same procedures as in Example 301.

Example 308

An AlN sintered body was prepared following the same procedures as in Example 301, except that $CeO_2$ was used as a sintering additive in place of $Y_2O_3$. The properties of the resultant sintered body were evaluated following the same procedures as in Example 301.

Example 309

An AlN sintered body was prepared following the same procedures as in Example 301, except that $La_2O_3$ was used as a sintering additive in place of $Y_2O_3$. The properties of the resultant sintered body were evaluated following the same procedures as in Example 301.

Comparative Example 31

An AlN sintered body was prepared following the same procedures as in Example 301, except that a sintering housing having an AlN internal wall (sintering housing D) was used. The properties of resultant sintered body were evaluated following the same procedures as in Example 301. Results are summarized in Table 8 (Part II). Results in the following comparative example are also summarized in Table 8 (Part II).

Comparative Example 32

An AlN sintered body was prepared following the same procedures as in Example 301, except that a sintering housing having a W internal wall (sintering housing F) was used. The properties of resultant sintered body were evaluated following the same procedures as in Example 301.

Example 401

$Y_2O_3$ (4 wt % based on yttrium element) having an average particle size of 0.9 μm were added as a sintering additive to an AlN powder containing 1.0 wt % of oxygen as an impurity and having an average particle size of 0.6 μm, and were mixed therewith by using a ball mill, thereby preparing a material. Four wt % of an organic binder were added to the material and the resultant mixture was granulated and pressed at a pressure of 500 kg/cm², thereby preparing a compact having a size of $38 \times 38 \times 10$ mm. The compact was heated to 700° C. in a nitrogen gas atmosphere to eliminate the binder, thereby obtaining a degreased body. The degreased body was placed in a carbon housing (sintering housing A) having an AlN bottom plate coated with a BN powder. Housing A has a size of 10 cm$\phi \times 3.7$ cm. The inner volume of the housing is 290 cm³. The ratio of the inner volume of housing A to the volume of the AlN sintered body is about $2 \times 10^1$. The material was sintered in the housing in the nitrogen gas atmosphere at a temperature of 1,950° C. and normal pressure for 24 hours. The density and particle size of the resultant AlN sintered body were measured. Results are summarized in Table 9 (Part I). A disk having a diameter of 10 mm and a thickness of 3.3 mm was prepared by cutting out the sintered body and served as a test sample. The thermal conductivity of the sample was measured by a laser flash method (use of TC-3000 available from Shinku Riko). A measuring temperature was 25° C. A result is also summarized in Table 9 (Part I). The aluminum nitride sintered body of Example 401 has a very high thermal conductivity of more than 200 W/m·K.

Elemental analysis of the resultant sintered body was also performed. Yttrium was analyzed by an ICP spectroscopic method (use of SPS-1200A available from Seiko Denshi Kogyo). The cationic impurity was measured by a chemical analysis. Impurity oxygen was measured by a nutron activation analysis (use of NAT-200-IC available from TOSHIBA). The sintering conditions and the properties of the sintered body are summarized in Table 9 (Part I). X-ray diffraction (use of Rotor Flex RU-200 available from Rigaku Denki; goniometer CN2173D5; beam source of Cu, 50 kV and 100 mA) of the sintered body was performed. The presence of a $Y_3AlC_{0.5}$ compound was confirmed.

Example 402

An AlN sintered body was prepared following the same procedures as in Example 401, except that 7 wt % of the sintering additive was used. The properties of the sintered body were evaluated following the same procedures as in Example 401. Results are summarized in Table 9 (Part I). Results in the following examples are also summarized in Table 9 (Part I).

Example 403

An AlN sintered body was prepared following the same procedures as in Example 401, except that the sintering temperature was changed to 1,850° C. The properties of the sintered body were evaluated following the same procedures as in Example 401.

Example 404

An AlN sintered body was prepared following the same procedures as in Example 401, except that the sintering temperature and the sintering atmosphere were changed. The properties of the sintered body were evaluated following the same procedures as in Example 401.

Example 405

An AlN sintered body was prepared following the same procedures as in Example 401, except that the sintering time and the sintering atmosphere were changed. The properties of the sintered body were evaluated following the same procedures as in Example 401.

Example 406

An AlN sintered body was prepared following the same procedures as in Example 401, except that a carbon housing (sintering housing B) having a BN bottom plate was used. The properties of the sintered body were evaluated following the same procedures as in Example 401.

Example 407

An AlN sintered body was prepared following the same procedures as in Example 401, except that a carbon housing (sintering housing C) having a carbon inner wall was used. The properties of the sintered body were evaluated following the same procedures as in Example 401.

Example 408

An AlN sintered body was prepared following the same procedures as in Example 401, except that $Sm_2O_3$ was used as a sintering additive in place of $Y_2O_3$. The properties of the resultant sintered body were evaluated following the same procedures as in Example 401.

Example 409

An AlN sintered body was prepared following the same procedures as in Example 401, except that $La_2O_3$ was used as a sintering additive in place of $Y_2O_3$. The properties of the resultant sintered body were evaluated following the same procedures as in Example 401.

Comparative Example 41

An AlN sintered body was prepared following the same procedures as in Example 401, except that a sintering housing having an AlN internal wall (sintering housing D) was used. The properties of resultant sintered body were evaluated following the same procedures as in Example 401. Results are summarized in Table 9 (Part II). Results in the following comparative example are also summarized in Table 9 (Part II).

Comparative Example 42

An AlN sintered body was prepared following the same procedures as in Example 401, except that a sintering housing having a W internal wall (sintering housing F) was used. The properties of resultant sintered body were evaluated following the same procedures as in Example 401.

TABLE 1

| Example No. | Raw Powder Particle Size (μm) | Raw Powder Oxygen-Content (wt %) | Additive Content: Y Weight (wt %) | Sintering Environment | Volume Ratio | Sintering Temperature (°C) | Sintering Time (HRS) | Sintering Atmosphere (atm) | Y Content (ppm) | Oxygen Content (ppm) | Density (g/cm³) | Grain Size (μm) | Thermal Conductivity (W/m·k) |
|---|---|---|---|---|---|---|---|---|---|---|---|---|---|
| 1 | 0.6 | 1.0 | 4 | A | $5 \times 10^1$ | 1900 | 96 | $N_2$ (1.0) | 140 | 400 | 3.262 | 15 | 255 |
| 2 | 0.6 | 1.0 | 0.01 | A | $5 \times 10^1$ | 1900 | 96 | $N_2$ (1.0) | 50 | 1500 | 3.261 | 18 | 200 |
| 3 | 0.6 | 1.0 | 1 | A | $5 \times 10^1$ | 1900 | 96 | $N_2$ (1.0) | 110 | 800 | 3.261 | 17 | 220 |
| 4 | 0.6 | 1.0 | 7 | A | $5 \times 10^1$ | 1900 | 96 | $N_2$ (1.0) | 150 | 500 | 3.263 | 15 | 250 |
| 5 | 0.6 | 1.0 | 10 | A | $5 \times 10^1$ | 1900 | 96 | $N_2$ (1.0) | 160 | 500 | 3.263 | 14 | 243 |
| 6 | 0.6 | 1.0 | 15 | A | $5 \times 10^1$ | 1900 | 96 | $N_2$ (1.0) | 180 | 600 | 3.263 | 12 | 235 |
| 7 | 0.6 | 1.0 | 0.5 | A | $5 \times 10^1$ | 1700 | 96 | $N_2$ (1.0) | 210 | 1300 | 3.259 | 10 | 201 |
| 8 | 0.6 | 1.0 | 1 | A | $5 \times 10^1$ | 1800 | 96 | $N_2$ (1.0) | 170 | 700 | 3.262 | 12 | 202 |
| 9 | 0.6 | 1.0 | 4 | A | $5 \times 10^1$ | 1850 | 96 | $N_2$ (1.0) | 170 | 600 | 3.262 | 13 | 251 |
| 10 | 0.6 | 1.0 | 4 | A | $5 \times 10^1$ | 1950 | 96 | $N_2$ (1.0) | 190 | 800 | 3.262 | 19 | 248 |
| 11 | 2.0 | 1.5 | 4 | A | $5 \times 10^1$ | 2000 | 96 | $N_2$ (1.0) | 250 | 1000 | 3.263 | 21 | 204 |
| 12 | 0.6 | 1.0 | 4 | A | $5 \times 10^1$ | 2000 | 4 | $N_2 + (5\%)H_2$ (10.0) | 430 | 1200 | 3.263 | 13 | 201 |
| 13 | 0.6 | 1.0 | 0.5 | A | $5 \times 10^1$ | 1950 | 6 | $N_2 + (5\%)H_2$ (1.0) | 350 | 1100 | 3.263 | 12 | 205 |
| 14 | 0.6 | 1.0 | 0.5 | A | $5 \times 10^1$ | 1950 | 12 | $N_2$ (1.0) | 240 | 900 | 3.264 | 14 | 211 |
| 15 | 0.6 | 1.0 | 1 | A | $5 \times 10^1$ | 1900 | 24 | $N_2$ (1.0) | 200 | 700 | 3.263 | 13 | 240 |
| 16 | 0.6 | 1.0 | 4 | A | $5 \times 10^1$ | 1900 | 192 | $N_2$ (1.0) | 100 | 400 | 3.262 | 20 | 260 |
| 17 | 0.6 | 1.0 | 4 | A | $5 \times 10^1$ | 190 | 384 | $N_2$ (1.0) | 50 | 300 | 3.261 | 25 | 269 |
| 18 | 1.5 | 1.5 | 1 | A | $1.1 \times 10^0$ | 1800 | 24 | $N_2$ (10.0) | 220 | 1400 | 3.262 | 11 | 203 |
| 19 | 1.5 | 1.5 | 1 | A | $2 \times 10^0$ | 1800 | 12 | $N_2$ (10.0) | 410 | 1000 | 3.263 | 12 | 200 |
| 20 | 0.6 | 1.0 | 4 | A | $1 \times 10^4$ | 1900 | 192 | $N_2$ (0.1) | 260 | 900 | 3.264 | 21 | 252 |
| 21 | 0.6 | 1.0 | 4 | A | $1 \times 10^7$ | 1950 | 192 | $N_2$ (0.1) | 290 | 900 | 3.264 | 26 | 257 |
| 22 | 0.6 | 1.0 | 4 | B | $5 \times 10^1$ | 1900 | 96 | $N_2$ (1.0) | 180 | 600 | 3.262 | 15 | 235 |
| 23 | 1.5 | 1.5 | 4 | B | $5 \times 10^1$ | 1900 | 96 | $N_2$ (1.0) | 200 | 1100 | 3.263 | 14 | 210 |
| 24 | 0.6 | 1.0 | 4 | C | $5 \times 10^1$ | 1900 | 96 | $N_2$ (1.0) | 130 | 400 | 3.263 | 16 | 213 |
| 25 | 1.5 | 1.5 | 4 | C | $5 \times 10^1$ | 1900 | 96 | $N_2$ (1.0) | 190 | 1000 | 3.263 | 17 | 209 |
| 26 | 0.6 | 1.0 | 4 | A | $5 \times 10^1$ | 1750 | 24 | vacuum (0.1) | 200 | 700 | 3.259 | 10 | 200 |
| 27 | 0.6 | 1.0 | 4 | A | $5 \times 10^1$ | 1850 | 96 | $N_2 + (5\%)H_2$ (0.1) | 160 | 600 | 3.262 | 14 | 240 |

TABLE 2

| | Raw Powder | | | Sintering Condition | | | | | Property of Sintered Body | | | | |
|---|---|---|---|---|---|---|---|---|---|---|---|---|---|
| Example No. | Particle Size (μm) | Oxygen Content (wt %) | Additive Content: Element, Weight (wt %) | Sintering Environment | Volume Ratio | Sintering Temperature (°C.) | Sintering Time (hrs) | Sintering Atmosphere (atm) | Rare Earth Element Content (ppm) | Oxygen Content (ppm) | Density (g/cm$^3$) | Grain Size (μm) | Thermal Conductivity (W/m · k) |
| 28 | 0.6 | 1.0 | Gd, 4 | A | $5 \times 10^1$ | 1900 | 96 | $N_2$ (1.0) | 290 | 800 | 3.264 | 14 | 212 |
| 29 | 0.6 | 1.0 | Dy, 4 | A | $5 \times 10^1$ | 1900 | 96 | $N_2$ (1.0) | 300 | 700 | 3.264 | 15 | 214 |
| 30 | 0.6 | 1.0 | La, 4 | A | $5 \times 10^1$ | 1900 | 96 | $N_2$ (1.0) | 250 | 900 | 3.263 | 14 | 210 |
| 31 | 0.6 | 1.0 | Ce, 4 | A | $5 \times 10^1$ | 1900 | 96 | $N_2$ (1.0) | 270 | 1000 | 3.263 | 13 | 211 |
| 32 | 0.6 | 1.0 | Pr, 4 | A | $5 \times 10^1$ | 1900 | 96 | $N_2$ (1.0) | 270 | 900 | 3.263 | 14 | 208 |
| 33 | 0.6 | 1.0 | Nd, 4 | A | $5 \times 10^1$ | 1900 | 96 | $N_2$ (1.0) | 290 | 1000 | 3.264 | 13 | 200 |
| 34 | 0.6 | 1.0 | Sm, 4 | A | $5 \times 10^1$ | 1900 | 96 | $N_2$ (1.0) | 310 | 800 | 3.264 | 12 | 213 |

TABLE 3

| Example No. | Raw Powder Particle Size (μm) | Raw Powder Oxygen Content (wt %) | Additive Content: Element, Weight (wt %) | Sintering Environment | Sintering Volume Ratio | Sintering Temperature (°C.) | Sintering Time (hrs) | Sintering Atmosphere (atm) | Rare Earth Element Content (ppm) | Oxygen Content (ppm) | Density (g/cm³) | Grain Size (μm0) | Thermal Conductivity (W/m · k) |
|---|---|---|---|---|---|---|---|---|---|---|---|---|---|
| 35 | 1.9 | 1.7 | Y, 5 | A | 5 × 10¹ | 1900 | 96 | N₂ (1.0) | 160 | 500 | 3.270 | 12 | 252 |
| 36 | " | " | Y, 7 | " | " | " | " | " | 150 | 500 | 3.272 | 13 | 255 |
| 37 | " | " | Y, 10 | " | " | " | " | " | 150 | 500 | 3.268 | 15 | 254 |
| 38 | " | " | Y, 15 | " | " | " | " | " | 140 | 400 | 3.271 | 14 | 256 |
| 39 | " | " | Y, 1 | " | " | " | " | " | 150 | 1000 | 3.267 | 12 | 215 |
| 40 | " | " | Y, 3 | " | " | " | " | " | 180 | 800 | 3.269 | 13 | 245 |
| 41 | " | " | Y, 5 | " | " | 1850 | " | " | 180 | 400 | 3.271 | 12 | 250 |
| 42 | " | " | " | " | " | 1700 | " | " | 450 | 1200 | 3.274 | 9 | 210 |
| 43 | " | " | " | " | " | 1600 | " | " | 1000 | 1500 | 3.279 | 8 | 205 |
| 44 | " | " | " | " | " | 2000 | " | " | 600 | 500 | 3.271 | 21 | 240 |
| 45 | " | 1.7 | Y, 5 | A | 5 × 10¹ | 2050 | 96 | N₂ (1.0) | 800 | 500 | 3.277 | 23 | 236 |
| 46 | " | " | Y, 10 | " | " | 1850 | " | " | 150 | 600 | 3.275 | 12 | 245 |
| 47 | " | " | Y, 1 | " | " | " | " | " | 140 | 1100 | 3.271 | 12 | 212 |
| 48 | " | " | Y, 5 | " | " | 1580 | " | " | 1500 | 1800 | 3.283 | 7 | 200 |
| 49 | 3.3 | 0.4 | Y, 0.1 | " | " | 1900 | " | " | 140 | 900 | 3.265 | 15 | 221 |
| 50 | " | " | Y, 0.5 | " | " | " | " | " | 150 | 400 | 3.267 | 18 | 260 |
| 51 | " | " | Y, 1.0 | " | " | " | " | " | 320 | 600 | 3.273 | 16 | 255 |
| 52 | " | " | Y, 3.0 | " | " | " | " | " | 550 | 600 | 3.279 | 17 | 241 |
| 53 | " | " | Y, 0.1 | " | " | 1850 | " | " | 140 | 1100 | 3.272 | 10 | 219 |
| 54 | " | " | Y, 0.5 | " | " | " | " | " | 160 | 600 | 3.266 | 11 | 258 |
| 55 | 3.3 | 0.4 | Y, 1.0 | A | 5 × 10¹ | 1850 | 96 | N₂ (1.0) | 320 | 700 | 3.267 | 14 | 253 |
| 56 | " | " | Y, 3.0 | " | " | " | " | " | 650 | 600 | 3.267 | 15 | 242 |
| 57 | " | " | Y, 0.05 | " | " | " | " | " | 90 | 1500 | 3.265 | 12 | 202 |
| 58 | " | " | Y, 0.01 | " | " | " | " | " | 10 | 2000 | 3.265 | 10 | 200 |
| 59 | 1.8 | 2.9 | Y, 10 | A | 5 × 10¹ | 1900 | 96 | N₂ (1.0) | 800 | 1300 | 3.276 | 15 | 209 |
| 60 | " | " | Y, 15 | " | " | " | " | " | 800 | 1000 | 3.276 | 14 | 215 |
| 61 | 1.9 | 1.7 | Y, 15 | " | " | 1850 | " | " | 1800 | 1200 | 3.282 | 15 | 210 |
| 62 | " | " | Y, 5 | " | " | 1900 | " | " | 160 | 500 | 3.270 | 13 | 252 |
| 63 | " | " | Y, 5 | " | " | " | " | N₂:CO = 99:1 (vol ratio) (1.0) | 210 | 800 | 3.269 | 13 | 243 |
| 64 | " | " | Y, 5 | " | " | " | " | N₂:CO = 95:5 (vol ratio) (1.0) | 150 | 500 | 3.270 | 13 | 253 |
| 65 | " | " | Y, 5 | " | " | " | " | N₂:H₂ = 99:1 (vol ratio) (1.0) | 180 | 600 | 3.271 | 13 | 248 |
| 66 | " | " | Y, 5 | " | " | " | " | N₂:H₂ = 99:1 (vol ratio) (1.0) | 170 | 400 | 3.270 | 14 | 253 |
| 67 | " | " | Y, 5 | " | " | " | " | N₂ (5.0) | 150 | 600 | 3.269 | 13 | 252 |
| 68 | " | " | Y, 5 | " | " | " | " | N₂ (10.0) | 2700 | 1900 | 3.284 | 9 | 202 |
| 69 | 1.9 | 1.7 | Y, 5 | A | 5 × 10¹ | 1900 | 4 | N₂ (1.0) | 2300 | 1200 | 3.283 | 10 | 218 |
| 70 | " | " | Y, 5 | " | " | " | 6 | " | 200 | 600 | 3.270 | 12 | 243 |
| 71 | " | " | Y, 5 | " | " | " | 24 | " | 150 | 300 | 3.265 | 20 | 265 |
| 72 | " | " | Y, 5 | " | " | " | 192 | " | 140 | 200 | 3.265 | 25 | 271 |
| 73 | 1.8 | 2.9 | Y, 15 | " | " | " | 384 | " | 3000 | 2000 | 3.285 | 10 | 200 |
| 74 | " | " | Y, 15 | " | " | " | 4 | " | 2300 | 1500 | 3.281 | 12 | 207 |
| 75 | " | " | Y, 15 | " | " | " | 24 | " | 210 | 1100 | 3.272 | 15 | 212 |
| 76 | " | " | Y, 15 | " | " | " | 192 | " | 140 | 800 | 3.268 | 20 | 230 |

TABLE 3-continued

| Example No. | Raw Powder Particle Size (μm) | Raw Powder Oxygen Content (wt %) | Additive Content: Element, Weight (wt %) | Sintering Environment | Sintering Volume Ratio | Sintering Temperature (°C.) | Sintering Time (hrs) | Sintering Atmosphere (atm) | Rare Earth Element Content (ppm) | Oxygen Content (ppm) | Density (g/cm³) | Grain Size (μm) | Thermal Conductivity (W/m·k) |
|---|---|---|---|---|---|---|---|---|---|---|---|---|---|
| 77 | " | " | Y, 15 | " | " | " | 384 | " | 140 | 600 | 3.268 | 24 | 238 |
| 78 | 1.9 | 1.7 | Y, 5 | " | 1 × 10⁷ | " | 192 | " | 140 | 300 | 3.270 | 18 | 272 |
| 79 | 1.9 | 1.7 | Y, 5 | A | 1 × 10⁴ | 1900 | 192 | N₂ (1.0) | 150 | 300 | 3.269 | 17 | 270 |
| 80 | " | " | Y, 5 | " | 2 × 10⁰ | " | " | " | 150 | 500 | 3.271 | 17 | 240 |
| 81 | " | " | Y, 5 | " | 1,1 × 10⁰ | " | " | " | 180 | 500 | 3.270 | 18 | 241 |
| 82 | " | " | Y, 5 | B | 5 × 10¹ | " | 96 | " | 160 | 500 | 3.270 | 12 | 249 |
| 83 | 1.8 | 0.8 | Y, 5 | B | 5 × 10¹ | 1900 | 96 | N₂ (1.0) | 170 | 500 | 3.269 | 12 | 250 |
| 84 | 1.9 | 1.7 | Y, 5 | C | " | " | " | " | 160 | 500 | 3.270 | 13 | 245 |
| 85 | " | " | Y, 5 | A | 1 × 10⁴ | 1700 | " | N₂:H₂ = 95:5 (vol ratio) (0.1) | 180 | 600 | 3.278 | 12 | 247 |
| 86 | " | " | Y, 5 | " | " | " | " | N₂ (0.1) | 170 | 600 | 3.271 | 12 | 240 |
| 87 | " | " | Y, 5 | Surrounded by infilled Carbon powder having average particle size of 0.02 μm | 2 × 10⁰ | 1800 | " | " | 180 | 600 | 3.269 | 11 | 246 |
| 88 | 3.0 | 0.34 | Y, 0.01 | A | 1 × 10⁷ | 1900 | 384 | N₂ (1.0) | 0.01 | 500 | 3.261 | 22 | 255 |
| 89 | 1.9 | 1.7 | Sc, 5 | A | 5 × 10¹ | 1900 | 96 | N₂ (1.0) | 280 | 700 | 3.269 | 11 | 215 |
| 90 | " | " | Ce, 5 | " | " | " | " | " | 150 | 600 | 3.272 | 13 | 242 |
| 91 | " | " | Dy, 5 | " | " | " | " | " | 150 | 500 | 3.271 | 12 | 245 |
| 92 | " | " | Y:Ce = 1:1, 5 | " | " | " | " | " | 150 | 500 | 3.270 | 12 | 250 |
| 93 | " | " | Y:Dy = 1:1, 5 | " | " | " | " | " | 140 | 400 | 3.271 | 13 | 252 |
| 94 | 2.6 | 1.1 | Y, 5 | A | 5 × 10¹ | 1800 | 96 | N₂ (1.0) | 260 | 600 | 3.251 | 14 | 245 |
| 95 | " | " | Y, 3 | A | " | " | " | " | 270 | 700 | 3.250 | 12 | 231 |
| 96 | " | " | Y, 10 | " | " | " | " | " | 300 | 500 | 3.255 | 14 | 238 |
| 97 | 3.3 | 0.4 | Y, 0.01 | " | " | " | " | " | 10 | 1800 | 3.120 | 10 | 201 |
| 98 | " | " | Y, 0.05 | " | " | " | " | " | 60 | 1200 | 3.153 | 12 | 221 |
| 99 | " | " | Y, 0.1 | " | " | " | " | " | 300 | 800 | 3.210 | 12 | 250 |
| 100 | " | " | Y, 1 | " | " | " | " | " | 550 | 500 | 3.256 | 12 | 252 |
| 101 | " | " | Y, 3 | " | " | " | " | " | 1000 | 600 | 3.256 | 16 | 245 |
| 102 | 1.8 | 2.9 | Y, 10 | " | " | " | " | " | 2500 | 2000 | 3.258 | 15 | 203 |
| 103 | " | " | Y, 15 | " | " | " | " | " | 1200 | 1100 | 3.255 | 14 | 215 |
| 104 | 2.6 | 1.1 | Y, 5 | A | 5 × 10¹ | 1800 | 4 | N₂ (1.0) | 1700 | 1800 | 3.258 | 15 | 205 |
| 105 | " | " | Y, 5 | " | " | " | 6 | " | 900 | 1700 | 3.253 | 8 | 209 |
| 106 | " | " | Y, 5 | " | " | " | 24 | " | 360 | 900 | 3.252 | 11 | 221 |
| 107 | " | " | Y, 5 | " | " | " | 192 | " | 240 | 600 | 3.251 | 14 | 253 |
| 108 | " | " | Y, 5 | " | " | " | 384 | " | 230 | 500 | 3.252 | 18 | 267 |
| 109 | 3.3 | 0.4 | Y, 1 | " | " | " | 4 | " | 1200 | 1200 | 3.258 | 21 | 220 |
| | | | | | | | | | | | | 9 | |

TABLE 3-continued

| Example No. | Raw Powder Particle Size (μm) | Raw Powder Oxygen Content (wt %) | Additive Content: Element, Weight (wt %) | Sintering Environment | Volume Ratio | Sintering Temperature (°C.) | Sintering Time (hrs) | Sintering Atmosphere (atm) | Rare Earth Element Content (ppm) | Oxygen Content (ppm) | Density (g/cm³) | Grain Size (μm) | Thermal Conductivity (W/m·k) |
|---|---|---|---|---|---|---|---|---|---|---|---|---|---|
| 110 | " | " | Y, 1 | " | " | " | 6 | " | 700 | 1000 | 3.256 | 12 | 223 |
| 111 | " | " | Y, 1 | " | " | " | 24 | " | 310 | 700 | 3.256 | 16 | 250 |
| 112 | " | " | Y, 1 | " | " | " | 192 | " | 220 | 400 | 3.255 | 20 | 267 |
| 113 | " | " | Y, 1 | " | " | " | 384 | " | 220 | 400 | 3.256 | 23 | 275 |
| 114 | 2.6 | 1.1 | Y, 5 | A | 5 × 10¹ | 1800 | 96 | N₂ (0.1) | 240 | 500 | 3.248 | 13 | 242 |
| 115 | " | " | Y, 5 | " | " | " | " | N₂ (5.0) | 230 | 600 | 3.252 | 16 | 248 |
| 116 | " | " | Y, 5 | " | " | " | " | N₂ (10.0) | 240 | 600 | 3.252 | 16 | 248 |
| 117 | " | " | Y, 5 | " | " | 1700 | " | N₂ (1.0) | 310 | 700 | 3.252 | 10 | 222 |
| 118 | 2.6 | 1.1 | Y, 5 | A | 5 × 10¹ | 1600 | 96 | N₂ (1.0) | 750 | 1200 | 3.158 | 8 | 211 |
| 119 | " | " | Y, 5 | " | " | 1550 | " | " | 1300 | 1900 | 3.139 | 7 | 202 |
| 120 | 3.0 | 0.4 | Y, 5 | " | " | 1800 | " | " | 1100 | 600 | 3.120 | 12 | 240 |
| 121 | " | " | Y, 5 | " | " | 1900 | " | " | 800 | 400 | 3.135 | 17 | 243 |
| 122 | " | " | Y, 5 | " | " | 2000 | " | " | 1300 | 500 | 3.153 | 23 | 242 |
| 123 | " | " | Y, 5 | " | " | 2050 | " | " | 1200 | 400 | 3.158 | 26 | 247 |
| 124 | 2.6 | 1.1 | Y, 5 | " | " | 1800 | " | N₂:CO = 99:1 (vol ratio) (1.0) | 300 | 600 | 3.156 | 14 | 246 |
| 125 | " | " | Y, 5 | " | " | " | " | N₂:CO = 95:5 (vol ratio) (1.0) | 440 | 900 | 3.250 | 13 | 231 |
| 126 | " | " | Y, 5 | " | " | " | " | N₂:H₂ = 99:1 (vol ratio) (1.0) | 290 | 600 | 3.248 | 14 | 245 |
| 127 | " | " | Y, 5 | " | " | " | " | N₂:H₂ = 95:5 (vol ratio) (1.0) | 320 | 700 | 3.251 | 14 | 241 |
| 128 | 2.6 | 1.1 | Y, 5 | A | 1 × 10⁷ | 1800 | 192 | N₂ (1.0) | 220 | 400 | 3.250 | 14 | 253 |
| 129 | " | " | Y, 5 | " | 1 × 10⁴ | " | " | " | 210 | 500 | 3.252 | 15 | 253 |
| 130 | " | " | Y, 5 | " | 2 × 10⁰ | " | " | " | 290 | 800 | 3.251 | 14 | 232 |
| 131 | " | " | Y, 5 | " | 1.1 × 10⁰ | " | " | " | 340 | 900 | 3.252 | 14 | 233 |
| 132 | 1.8 | 2.9 | Y, 5 | B | 5 × 10¹ | " | 96 | " | 300 | 600 | 3.251 | 14 | 243 |
| 133 | 2.6 | 1.1 | Y, 5 | " | " | " | " | " | 3000 | 1800 | 3.249 | 15 | 203 |
| 134 | " | " | Y, 5 | C | " | " | " | " | 230 | 600 | 3.248 | 14 | 246 |
| 135 | " | " | Y, 5 | A | 1 × 10⁴ | 1700 | 192 | N₂ (0.1) | 430 | 800 | 3.210 | 9 | 221 |
| 136 | " | " | Y, 5 | " | " | " | " | N₂:N₂ = 95:5 (vol ratio) (0.1) | 440 | 800 | 3.211 | 9 | 219 |
| 137 | 2.6 | 1.1 | Y, 5 | A Surrounded by Infilled Carbon powder having average particle size of 0.02 μm | 2 × 10⁰ | 1800 | 96 | N₂ (1.0) | 230 | 500 | 3.248 | 13 | 246 |
| 138 | 2.6 | 1.1 | Sc, 5 | A | 5 × 10¹ | 1800 | 96 | N₂ (1.0) | 260 | 1600 | 3.210 | 12 | 207 |
| 139 | " | " | Ce, 7 | " | " | " | " | " | 250 | 800 | 3.251 | 13 | 235 |
| 140 | " | " | Dy, 10 | " | " | " | " | " | 300 | 800 | 3.258 | 15 | 238 |

TABLE 3-continued

| | Raw Powder | | Additive Content: | Sintering Condition | | | | | | Property of Sintered Body | | | | |
|---|---|---|---|---|---|---|---|---|---|---|---|---|---|---|
| Example No. | Particle Size (μm) | Oxygen Content (wt %) | Element, Weight (wt %) | Sintering Environment | Volume Ratio | Sintering Temperature (°C) | Sintering Time (hrs) | Sintering Atmosphere (atm) | | Rare Earth Element Content (ppm) | Oxygen Content (ppm) | Density (g/cm³) | Grain Size (μm) | Thermal Conductivity (W/m·k) |
| 141 | " | " | Y:Ce = 1:1, 5 | " | " | " | " | " | | 270 | 600 | 3.254 | 13 | 241 |
| 142 | " | " | Y:Dy = 1:1, 5 | " | " | " | " | " | | 320 | 500 | 3.256 | 14 | 243 |

TABLE 4

| | Sintering Conditions | | | | | | | | |
|---|---|---|---|---|---|---|---|---|---|
| | Lattice Constant of AlN of Raw Powder | | Oxygen Content of Raw AlN Powder | Additive Content | $YF_3$ Content | Sintering Housing | Sintering Temperature | Sintering Time | Sintering Atmosphere |
| | a-axis (pm) | c-axis (pm) | (wt %) | (wt %) | (wt %) | | (°C.) | (h) | (Torr) |
| Example 143 | 311.15 | 498.09 | 1.0 | $Y_2O_3$ 5 | 1 | A | 1870 | 200 | $N_2$ 700 |
| 144 | 311.13 | 498.02 | 1.1 | $Y_2O_3$ 5 | 1 | A | 1870 | 6 | $N_2$ 700 |
| 145 | 311.13 | 498.05 | 1.7 | $Y_2O_3$ 7 | 0 | A | 1870 | 100 | $N_2$ 700 |
| 146 | 311.13 | 498.03 | 0.9 | $CeO_2$ 4 | 1 | A | 1870 | 200 | $N_2$ 700 |
| Reference Example 1 | 311.14 | 497.81 | 2.3 | $Y_2O_3$ 7 | 3 | A | 1870 | 200 | $N_2$ 700 |
| 2 | 311.90 | 498.50 | 6.0 | $Y_2O_3$ 10 | 3 | A | 1870 | 200 | $N_2$ 700 |
| 3 | 311.15 | 498.09 | 1.0 | $Y_2O_3$ 5 | 0 | A | 1870 | 200 | $N_2$ 700 |
| 4 | 311.15 | 498.09 | 1.0 | $Y_2O_3$ 5 | 1 | A | 1870 | 2 | $N_2$ 760 |
| 5 | 311.15 | 498.09 | 1.0 | $Y_2O_3$ 5 | 1 | D | 1870 | 100 | $N_2$ 500 |
| 6 | 311.15 | 498.09 | 1.0 | $Y_2O_3$ 5 | 1 | A | 1800 | 200 | $N_2$ 500 |
| 7 | 311.15 | 498.09 | 1.0 | $Y_2O_3$ 5 | 1 | A | 1950 | 200 | $N_2$ 700 |

TABLE 5

| | Properties of Sintered Body | | | | | | Apparent Absorption Coefficient | | Thermal Conductivity $(Wm^{-1}K^{-1})$ | Content of Group VIIa and VIIIa Impurity Element (ppm) | Average Grain size (μm) |
|---|---|---|---|---|---|---|---|---|---|---|---|
| | Yttrium Content (ppm) | Oxygen Content (ppm) | Density (g/cm³) | Porosity (%) | Lattice Constant | | at 330 nm $(cm^{-1})$ | at 500 nm $(cm^{-1})$ | | | |
| | | | | | a-axis (pm) | c-axis (pm) | | | | | |
| Example | | | | | | | | | | | |
| 143 | 50 | 120 | 3.257 | 0.001 | 311.15 | 498.13 | 5.6 | 1.4 | 270 | less than 100 | 20 |
| 144 | 400 | 1100 | 3.263 | 0.1 | 311.13 | 498.01 | 65 | 25 | 235 | 590 | 11 |
| 145 | 150 | 400 | 3.261 | 0.05 | 311.12 | 498.06 | 12 | 9.5 | 255 | 240 | 15 |
| 146 | 0 (Ce 100 ppm) | 2000 | 3.262 | 0.3 | 311.13 | 498.05 | 32 | 20 | 225 | 250 | 22 |
| Reference Example | | | | | | | | | | | |
| 1 | 180 | 500 | 3.259 | 0.7 | 311.13 | 497.78 | more than 200 | 70 | 195 | 200 | 22 |
| 2 | 250 | 700 | 3.262 | 1.8 | 311.90 | 498.26 | opaque | 100 | 170 | 2000 | 23 |
| 3 | 150 | 700 | 3.260 | 1.2 | 311.13 | 497.96 | opaque | 40 | 230 | 1000 | 22 |
| 4 | 28000 | 10000 | 3.341 | 1.1 | 311.12 | 497.97 | opaque | 80 | 180 | — | 6 |
| 5 | 18000 | 13000 | 3.347 | 1.1 | 311.12 | 497.85 | opaque | 100 | 195 | — | 15 |
| 6 | 170 | 700 | 3.266 | 0.5 | 311.13 | 497.94 | about 200 | 70 | 200 | — | 11 |
| 7 | 290 | 900 | 3.264 | 1.5 | 311.13 | 497.97 | 150 | 30 | 265 | — | 27 |

(The apparent absorbance in Table 5 is obtained by total transmittance of a sample having a thickness of 0.2 mm and a diameter of 20 mm.)

TABLE 6

| Comparative Example No. | Raw Powder | | Additive Content: Y, Element (wt %) | Sintering Condition | | | | |
|---|---|---|---|---|---|---|---|---|
| | Particle Size (μm) | Oxygen Content (wt %) | | Sintering Environment | Volume Ratio | Sintering Temperature (°C.) | Sintering Time (hrs) | Sintering Atmosphere (atm) |
| 1 | 0.6 | 1.0 | 4 | A | $5 \times 10^1$ | 1900 | 2 | $N_2$ (1.0) |
| 2 | 0.6 | 1.0 | 4 | B | $5 \times 10^1$ | 1900 | 2 | $N_2$ (1.0) |
| 3 | 0.6 | 1.0 | 4 | C | $5 \times 10^1$ | 1900 | 2 | $N_2$ (1.0) |
| 4 | 0.6 | 1.0 | 4 | D | $5 \times 10^1$ | 1900 | 96 | $N_2$ (1.0) |
| 5 | 0.6 | 1.0 | 4 | E | $5 \times 10^1$ | 1900 | 96 | $N_2$ (1.0) |
| 6 | 0.6 | 1.0 | 4 | F | $5 \times 10^1$ | 1900 | 96 | $N_2$ (1.0) |
| 7 | 0.6 | 1.0 | — | — | — | 1900 | 1 | $N_2$ (1.0) |

| Comparative Example No. | Property of Sintered Body | | | | |
|---|---|---|---|---|---|
| | Y Content (ppm) | Oxygen Content (ppm) | Density (g/cm³) | Average Grain Size (μm) | Thermal Conductivity (W/m·k) |
| 1 | 28000 | 10000 | 3.341 | 6 | 168 |
| 2 | 29000 | 11000 | 3.339 | 6 | 165 |
| 3 | 20000 | 9000 | 3.337 | 6 | 170 |
| 4 | 18000 | 13000 | 3.348 | 16 | 168 |
| 5 | 20000 | 16000 | 3.359 | 17 | 160 |
| 6 | 19000 | 14000 | 3.360 | 15 | 157 |

TABLE 6-continued

| 7 | — | 7000 | 3.261 | 5 | 80 |

TABLE 7

| Example No. | Raw Powder Particle Size (μm) | Raw Powder Oxygen Content (wt %) | Additive Content: Element, Weight (wt %) | Sintering Environment | Volume Ratio | Sintering Temperature (°C) | Sintering Time (hrs) | Sintering Atmosphere (atm) | Second Phase | Rare Earth Element Content (ppm) | Oxygen Content (ppm) | Density (g/cm³) | Grain Size (μm) | Thermal Conductivity (W/m·K) |
|---|---|---|---|---|---|---|---|---|---|---|---|---|---|---|
| 201 | 0.8 | 1.2 | Y, 4 | A | 3 × 10¹ | 1950 | 24 | N₂ (1.0) | YN | 900 | 600 | 3.270 | 15 | 236 |
| 203 | 0.8 | 1.2 | Y, 1 | A | 3 × 10¹ | 1950 | 24 | N₂ (1.0) | YN | 660 | 1100 | 3.265 | 16 | 210 |
| 204 | 0.8 | 1.2 | Y, 10 | A | 3 × 10¹ | 1950 | 24 | N₂ (1.0) | YN | 1700 | 800 | 3.281 | 13 | 220 |
| 205 | 0.8 | 1.2 | Y, 15 | A | 3 × 10¹ | 1950 | 24 | N₂ (1.0) | YN | 3500 | 800 | 3.295 | 12 | 205 |
| 207 | 0.8 | 1.2 | Y, 4 | A | 3 × 10¹ | 1800 | 24 | N₂ (1.0) | YN | 1000 | 800 | 3.272 | 10 | 225 |
| 208 | 0.8 | 1.2 | Y, 4 | A | 3 × 10¹ | 2000 | 24 | N₂ (1.0) | YN | 800 | 600 | 3.268 | 20 | 233 |
| 210 | 0.8 | 1.2 | Y, 4 | A | 3 × 10¹ | 1950 | 12 | N₂ (1.0) | YN, Y₂O₃ | 1500 | 1000 | 3.266 | 9 | 230 |
| 211 | 0.8 | 1.2 | Y, 4 | A | 3 × 10¹ | 1950 | 96 | N₂ (1.0) | YN, Y₂O₃ | 500 | 500 | 3.264 | 18 243 | |
| 212 | 0.8 | 1.2 | Y, 4 | A | 3 × 10¹ | 1950 | 24 | N₂ + (5%)H₂ | YN, Y₂O₃ | 1400 | 800 | 3.271 | 14 | 228 |
| 213 | 0.8 | 1.2 | Y, 4 | A | 3 × 10¹ | 1950 | 24 | N₂ + (5%)H₂ (10.0) | YN, Y₂O₃ | 1500 | 900 | 3.273 | 13 | 219 |
| 214 | 0.8 | 1.2 | Y, 4 | A | 3 × 10¹ | 1950 | 24 | N₂ (0.1) | YN, Y₂O₃ | 1200 | 900 | 3.269 | 15 | 230 |
| 215 | 0.8 | 1.2 | Y, 4 | A | 3 × 10¹ | 1950 | 24 | N₂ + (5%)CO | YN, Y₂O₃ | 2000 | 1300 | 3.275 | 15 | 212 |
| 216 | 0.8 | 1.2 | Y, 4 | A | 1.1 × 10⁰ | 1950 | 24 | N₂ (1.0) | YN, Y₂O₃ | 1500 | 1000 | 3.278 | 12 | 210 |
| 217 | 0.8 | 1.2 | Y, 4 | A | 3 × 10⁴ | 1950 | 24 | N₂ (1.0) | YN, Y₂O₃ | 800 | 600 | 3.267 | 14 | 232 |
| 218 | 0.8 | 1.2 | Y, 4 | A | 3 × 10⁶ | 1950 | 24 | N₂ (1.0) | YN, Y₂O₃ | 1100 | 900 | 3.271 | 15 | 229 |
| 219 | 0.8 | 1.2 | Y, 4 | B | 3 × 10¹ | 1950 | 24 | N₂ (1.0) | YN | 900 | 600 | 3.272 | 15 | 230 |
| 220 | 0.8 | 1.2 | Y, 4 | C | 3 × 10¹ | 1950 | 24 | N₂ (1.0) | YN | 1000 | 600 | 3.275 | 14 | 226 |
| 221 | 0.8 | 1.2 | Sc, 4 | A | 3 × 10¹ | 1950 | 24 | N₂ (1.0) | ScN, Sc₂O₃ | 4000 | 1500 | 3.267 | 11 | 181 |
| 222 | 0.8 | 1.2 | SC, 1 | A | 3 × 10¹ | 1950 | 24 | N₂ (1.0) | ScN | 2800 | 1300 | 3.264 | 12 | 195 |
| 223 | 0.8 | 1.2 | Sc, 4 | A | 3 × 10¹ | 2000 | 24 | N₂ (1.0) | ScN | 1500 | 1200 | 3.263 | 13 | 189 |
| 224 | 0.8 | 1.2 | Ce, 4 | A | 3 × 10¹ | 1950 | 24 | N₂ (1.0) | CeN, CeO₂ | 3800 | 1400 | 3.301 | 14 | 197 |
| 225 | 0.8 | 1.2 | Ce, 1 | A | 3 × 10¹ | 1950 | 24 | N₂ (1.0) | CeN | 3500 | 1300 | 3.310 | 16 | 205 |
| 226 | 0.8 | 1.2 | Ce, 4 | A | 3 × 10¹ | 2000 | 12 | N₂ (1.0) | CeN | 3200 | 1300 | 3.295 | 15 | 200 |
| 227 | 0.8 | 1.2 | Dy, 4 | A | 3 × 10¹ | 1950 | 24 | N₂ (1.0) | DyN, Dy₂O₃ | 4500 | 1500 | 3.295 | 12 | 225 |
| 228 | 0.8 | 1.2 | Dy, 1 | A | 3 × 10¹ | 1950 | 24 | N₂ (1.0) | 3300 | 1300 | 3.278 | 15 | 231 | |
| 229 | 0.8 | 1.2 | Dy, 4 | A | 3 × 10¹ | 2000 | 12 | N₂ (1.0) | DyN | 3000 | 1400 | 3.280 | 13 | 220 |
| 230 | 0.8 | 1.2 | Y:Sc = 1:1, 4 | A | 3 × 10¹ | 1950 | 24 | N₂ (1.0) | ScN, YN | 1900 | 1000 | 3.268 | 14 | 212 |
| 231 | 0.8 | 1.2 | Y:Ce = 1:1, 1 | A | 3 × 10¹ | 1950 | 24 | N₂ (1.0) | YN, CeN | 2200 | 1300 | 3.283 | 15 | 209 |
| 232 | 0.8 | 1.2 | Y:Dy = 1:1, 4 | A | 3 × 10¹ | 1950 | 24 | N₂ (1.0) | YN, DyN | 2300 | 1100 | 3.272 | 13 | 228 |

| Comparative Example No. | Raw Powder Particle Size (μm) | Raw Powder Oxygen Content (wt %) | Additive Content: Element, Weight (wt %) | Sintering Environment | Volume Ratio | Sintering Temperature (°C) | Sintering Time (hrs) | Sintering Atmosphere (atm) | Second Phase | Rare Earth Element Content (ppm) | Oxygen Content (ppm) | Density (g/cm³) | Grain Size (μm) | Thermal Conductivity (W/m·K) |
|---|---|---|---|---|---|---|---|---|---|---|---|---|---|---|
| 11 | 0.8 | 1.2 | Y, 4 | A | 3 × 10¹ | 1950 | 2 | N₂ (1.0) | Y₄Al₂O₉, Y₂O₃ | 25000 | 10000 | 3.345 | 5 | 165 |
| 12 | 0.8 | 1.2 | Y, 4 | B | e × 10¹ | 1950 | 2 | N₂ (1.0) | Y₄Al₂O₉, Y₂O₃ | 26000 | 12000 | 3.344 | 5 | 161 |
| 13 | 0.8 | 1.2 | Y, 4 | C | 3 × 10¹ | 1950 | 2 | N₂ (1.0) | Y₄Al₂O₉, Y₂O₃ | 22000 | 9000 | 3.342 | 5 | 167 |
| 14 | 0.8 | 1.2 | Y, 4 | D | 3 × 10¹ | 1950 | 24 | N₂ (1.0) | YAlO₃, Y₄Al₂O₉ | 19000 | 13000 | 3.352 | 14 | 160 |
| 15 | 0.8 | 1.2 | Y, 4 | E | 3 × 10¹ | 1950 | 24 | N₂ (1.0) | Y₃Al₅O₁₂, YAlO₃ | 21000 | 17000 | 3.360 | 15 | 159 |
| 16 | 0.8 | 1.2 | Y, 4 | F | 3 × 10¹ | 1950 | 24 | N₂ (1.0) | YAlO₃ | 20000 | 16000 | 3.365 | 13 | 155 |
| 17 | 0.8 | 1.2 | — | — | — | 1950 | 1 | N₂ (1.0) | Al—O—N | — | 8000 | 3.259 | 5 | 77 |
| 18 | 0.8 | 1.2 | Sc, 4 | D | 3 × 10¹ | 1950 | 24 | N₂ (1.0) | Sc—Al—O | 19000 | 17000 | 3.283 | 14 | 109 |
| 19 | 0.8 | 1.2 | Ce, 4 | D | 3 × 10¹ | 1950 | 24 | N₂ (1.0) | Ce—Al—O | 28000 | 15000 | 3.345 | 12 | 165 |
| 20 | 0.8 | 1.2 | Dy, 4 | D | 3 × 10¹ | 1950 | 24 | N₂ (1.0) | Dy—Al—O | 31000 | 13000 | 3.410 | 15 | 168 |
| 21 | 0.8 | 1.2 | Y:Dy = 1:1, 4 | D | 3 × 10¹ | 1950 | 24 | N₂ (1.0) | (Y,Dy)—Al—O | 25000 | 16000 | 3.365 | 13 | 163 |

TABLE 8

| | Sintering Condition | | | | | | | |
|---|---|---|---|---|---|---|---|---|
| | Raw Powder | | Additive Content: | | | Sintering | Sinter- | Sintering |
| | Particle Size ($\mu$m) | Oxygen Content (wt %) | Element, Weight (wt %) | Sintering Environment | Volume Ratio | Temperature (°C.) | ing Time (hrs) | Atmosphere (atm) |
| Example No. | | | | | | | | |
| 301 | 0.6 | 1.0 | Y, 4 | A | $2 \times 10^1$ | 1950 | 24 | Ar (1.0) |
| 302 | 0.6 | 1.0 | Y, 7 | A | $2 \times 10^1$ | 1950 | 24 | Ar (1.0) |
| 303 | 0.6 | 1.0 | Y, 4 | A | $2 \times 10^1$ | 1750 | 24 | Ar (1.0) |
| 304 | 0.6 | 1.0 | Y, 4 | A | $2 \times 10^1$ | 2000 | 24 | Ar (10.0) |
| 305 | 0.6 | 1.0 | Y, 4 | A | $2 \times 10^1$ | 1950 | 12 | $H_2$ (0.1) |
| 306 | 0.6 | 1.0 | Y, 4 | G | $2 \times 10^1$ | 1950 | 24 | Ar (1.0) |
| 307 | 0.6 | 1.0 | Y, 4 | C | $2 \times 10^1$ | 1950 | 24 | Ar (1.0) |
| 308 | 0.6 | 1.0 | Ce, 4 | A | $2 \times 10^1$ | 1950 | 24 | Ar (1.0) |
| 309 | 0.6 | 1.0 | La, 4 | A | $1 \times 10^1$ | 1950 | 24 | Ar (1.0) |
| Comparative Example No. | | | | | | | | |
| 31 | 0.6 | 1.0 | Y, 4 | D | $2 \times 10^1$ | 1950 | 24 | Ar (1.0) |
| 32 | 0.6 | 1.0 | Y, 4 | F | $2 \times 10^1$ | 1950 | 24 | Ar (1.0) |

| | Property of Sintered Body | | | | | |
|---|---|---|---|---|---|---|
| | Second Phase | Rare Earth Element Content (ppm) | Oxygen Content (ppm) | Density (g/cm$^3$) | Grain Size ($\mu$m) | Thermal Conductivity (W/m · K) |
| Example No. | | | | | | |
| 301 | $YC_2$ | 1000 | 650 | 3.269 | 13 | 225 |
| 302 | $YC_2$ | 1600 | 550 | 3.275 | 12 | 212 |
| 303 | $YC_2, Y_2O_3$ | 2200 | 1200 | 3.284 | 10 | 195 |
| 304 | $YC_2$ | 2400 | 1400 | 3.274 | 18 | 198 |
| 305 | $YC_2$ | 2600 | 1200 | 3.275 | 11 | 200 |
| 306 | $YC_2$ | 2100 | 900 | 3.271 | 12 | 205 |
| 307 | $YC_2$ | 1500 | 700 | 3.270 | 13 | 199 |
| 308 | $CeC_2$ | 2300 | 650 | 3.280 | 10 | 180 |
| 309 | $LaC_2$ | 1600 | 600 | 3.270 | 12 | 188 |
| Comparative Example No. | | | | | | |
| 31 | Y—Al—O Compound | 19000 | 14000 | 3.352 | 12 | 160 |
| 32 | Y—Al—O Compound | 20000 | 15000 | 3.360 | 11 | 152 |

TABLE 9

| | Sintering Condition | | | | | | | |
|---|---|---|---|---|---|---|---|---|
| | Raw Powder | | Additive Content: | | | Sintering | Sinter- | Sintering |
| | Particle Size ($\mu$m) | Oxygen Content (wt %) | Element, Weight (wt %) | Sintering Environment | Volume Ratio | Temperature (°C.) | ing Time (hrs) | Atmosphere (atm) |
| Example No. | | | | | | | | |
| 401 | 0.6 | 1.0 | Y, 4 | A | $2 \times 10^1$ | 1950 | 24 | $N_2$ (1.0) |
| 402 | 0.6 | 1.0 | Y, 7 | A | $2 \times 10^1$ | 1950 | 24 | $N_2$ (1.0) |
| 403 | 0.6 | 1.0 | Y, 7 | A | $2 \times 10^1$ | 1850 | 24 | $N_2$ (1.0) |
| 404 | 0.6 | 1.0 | Y, 7 | A | $2 \times 10^1$ | 2000 | 24 | $N_2$ (10.0) |
| 405 | 0.6 | 1.0 | Y, 7 | A | $2 \times 10^1$ | 1950 | 12 | $N_2$ (0.1) |
| 406 | 0.6 | 1.0 | Y, 7 | B | $2 \times 10^1$ | 1950 | 24 | $N_2$ (1.0) |
| 407 | 0.6 | 1.0 | Y, 7 | C | $2 \times 10^1$ | 1950 | 24 | $N_2$ (1.0) |
| 408 | 0.6 | 1.0 | Sm, 7 | A | $2 \times 10^1$ | 1950 | 24 | $N_2$ (1.0) |
| 409 | 0.6 | 1.0 | La, 7 | A | $2 \times 10^1$ | 1950 | 24 | $N_2$ (1.0) |
| Comparative Example No. | | | | | | | | |
| 41 | 0.6 | 1.0 | Y, 4 | D | $2 \times 10^1$ | 1950 | 24 | $N_2$ (1.0) |
| 42 | 0.6 | 1.0 | Y, 4 | F | $2 \times 10^1$ | 1950 | 24 | $N_2$ (1.0) |

| | Property of Sintered Body | | | | | |
|---|---|---|---|---|---|---|
| | Second Phase | Rare Earth Element Content (ppm) | Oxygen Content (ppm) | Density (g/cm$^3$) | Grain Size ($\mu$m) | Thermal Conductivity (W/m · K) |
| Example No. | | | | | | |
| 401 | $Y_3AlC_{0.5}$ | 1000 | 600 | 3.268 | 13 | 231 |
| 402 | $Y_3AlC_{0.5}$ | 1500 | 600 | 3.271 | 12 | 228 |
| 403 | $Y_3AlC_{0.5}, Y_2O_3$ | 1700 | 800 | 3.272 | 10 | 225 |
| 404 | $Y_3AlC_{0.5}$ | 2500 | 1500 | 3.275 | 18 | 195 |
| 405 | $Y_3AlC_{0.5}$ | 2400 | 1100 | 3.271 | 11 | 205 |
| 406 | $Y_3AlC_{0.5}$ | 2000 | 800 | 3.269 | 12 | 211 |
| 407 | $Y_3AlC_{0.5}$ | 1500 | 700 | 3.270 | 13 | 199 |

TABLE 9-continued

| | | | | | | |
|---|---|---|---|---|---|---|
| 408 | Sm—Al—C Compound | 2100 | 700 | 3.270 | 10 | 190 |
| 409 | La—Al—C Compound | 1500 | 800 | 3.269 | 12 | 193 |
| Comparative Example No. | | | | | | |
| 41 | Y—Al—O Compound | 19000 | 14000 | 3.352 | 12 | 160 |
| 42 | Y—Al—O Compound | 20000 | 15000 | 3.360 | 11 | 152 |

What is claimed is:

1. An aluminum nitride sintered body consisting essentially of:
   (a) an AlN single-phase; and
   (b) a second phase containing rare earth elements, the contents of rare earth elements and oxygen in the entire sintered body being 0.01 to 8,000 ppm, and less than 2,000 ppm, respectively.

2. The sintered body according to claim 1, wherein the content of rare earth elements is 0.01 to 3,000 ppm.

3. The sintered body according to claim 1, wherein the content of rare earth elements is 10 to 3,000 ppm.

4. The sintered body according to claim 1, wherein the rare earth element is at least one element selected from the group consisting of Y, Ce, Sc, and Dy.

5. The sintered body according to claim 1, wherein the rare earth element is Y.

6. The sintered body according to claim 1, wherein the sintered body has a density of 3.120 to 3.285 g/cm$^3$.

7. The sintered body according to claim 1, wherein the sintered body has a density of 3.259 to 3.264 g/cm$^3$.

8. The sintered body according to claim 1, wherein the sintered body essentially consists of AlN grains having an average particle size of not less than 7 μm.

9. The sintered body according to claim 1, wherein the sintered body essentially consists of AlN grains having an average particle size of not less than 10 μm.

10. The sintered body according to claim 1, wherein a total content of impurities excluding the rare earth element is not more than 1,000 ppm.

11. The sintered body according to claim 1, wherein the sintered body has a thermal conductivity of not less than 200 W/m·K (25° C).

12. The sintered body according to claim 1, wherein the sintered body has a porosity of not more than 1%, a lattice constant of 497.95 to 498.20 pm along a c-axis of an aluminum nitride hexagonal lattice, and a density of 3.255 to 3.275 g/cm$^3$.

13. The sintered body according to claim 1, wherein the sintered body has an apparent absorption coefficient of not more than 50 cm$^{-1}$ at a wavelength of 500 nm, and not more than 70 cm$^{-1}$ at a wavelength of 330 nm.

14. The sintered body according to claim 1, wherein the sintered body has an apparent absorbance of not more than 20 cm$^{-1}$ at a wavelength of 500 nm, and not more than 50 cm$^{-1}$ at a wavelength of 330 nm.

15. The sintered body according to claim 1, wherein the sintered body further contains a (rare earth element)—N compound as a second phase.

16. The sintered body according to claim 1, wherein the sintered body further contains a (rare earth element)—C compound as a second phase.

17. The sintered body according to claim 1, wherein the sintered body further contains a (rare earth element)—Al—C compound and (rare earth element)—O compound or a combination thereof as a second phase.

18. The sintered body according to claim 1, wherein the sintered body contains a (rare earth element)—Al—O compound as a second phase.

19. A method of fabricating an aluminum nitride sintered body consisting essentially of an AlN single-phase, and a second phase containing rare earth elements, the contents of rare earth elements and oxygen in the entire sintered body being 0.01 to 8,000 ppm and less than 2,000 ppm of oxygen, respectively, which comprises firing in a reducing atmosphere in a sintering housing producing vaporized carbon during sintering at a temperature of 1,550° to 2,050° C. for at least four hours either:
   (a) a molded body prepared by mixing and molding an aluminum nitride powder having less than 7 wt. % of oxygen and an average particle size of 0.05 to 5 μm and with one or more rare earth compounds in the amount of 0.01 to 15 wt. %, based on the rare earth element content, or
   (b) a sintered AlN body containing oxide grain boundary phases having 0.01 to 15 wt. % of rare earth elements and 0.01 to 20 wt. % of oxygen and (rare earth element) —Al—O compound phases and (rare earth element) —O compound phases or a combination thereof.

20. The method according to claim 19, wherein the reducing atmosphere contains nitrogen and at least one element selected from the group consisting of hydrogen, carbon monoxide, carbon gas, and solid-state carbon.

21. The method according to claim 19, wherein the sintering housing contains a material which produces carbon gas or housing material itself produces carbon gas during sintering.

22. The method according to claim 19, wherein the rare earth element is at least one element selected from the group consisting of Y, Ce, Sc, and Dy.

23. The method according to claim 19, wherein the rare earth element is Y.

24. The method according to claim 19, wherein a sintering housing is made of carbon or is a carbon housing having an aluminum nitride, BN or tungsten bottom plate for supporting the molded or sintered body.

25. The method according to claim 19, wherein a ratio of an inner volme of a sintering housing to a volume of the molded or sintered body is $1 \times 10^0$ to $1 \times 10^7$.

* * * * *